US007058690B2

(12) United States Patent
Maehiro

(10) Patent No.: US 7,058,690 B2
(45) Date of Patent: Jun. 6, 2006

(54) METHOD FOR REGISTERING USER INFORMATION TO EXCHANGE MESSAGE ON NETWORK

(75) Inventor: Kazutoyo Maehiro, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 764 days.

(21) Appl. No.: 10/107,198

(22) Filed: Mar. 28, 2002

(65) Prior Publication Data

US 2002/0169855 A1 Nov. 14, 2002

(30) Foreign Application Priority Data

May 11, 2001 (JP) ............................. 2001-142284

(51) Int. Cl.
*G06F 15/16* (2006.01)
(52) U.S. Cl. ...................... 709/206; 709/204; 709/205; 709/207; 715/751; 715/758
(58) Field of Classification Search ................ 709/204, 709/219, 205, 206, 207; 715/751, 758
See application file for complete search history.

(56) References Cited

U.S. PATENT DOCUMENTS

| 6,205,478 | B1 | 3/2001 | Sugano et al. | |
|---|---|---|---|---|
| 6,269,369 | B1* | 7/2001 | Robertson | 707/10 |
| 2002/0120760 | A1* | 8/2002 | Kimchi et al. | 709/230 |
| 2004/0049424 | A1* | 3/2004 | Murray et al. | 705/14 |
| 2004/0215735 | A1* | 10/2004 | Nakahara et al. | 709/207 |
| 2005/0120084 | A1* | 6/2005 | Hu et al. | 709/206 |

FOREIGN PATENT DOCUMENTS

| JP | 2000-32033 | 1/2000 |
|---|---|---|
| JP | 2001-14254 | 1/2001 |

OTHER PUBLICATIONS http://www.batchmates.com/helpbuddylist.asp, "Frequently Asked Questions, Help—My Buddy List", Aug. 06, 2002.*
http://www.gay.com/help/personalsfaq.html, "Can I remove myself from someone else's Buddy List?", 2003.*
http://www.wackyb.com/zzub/lofiversion/index.php/t7650.html, "Removing myself from someone else's buddy list".*
http://www.wackyb.com/zzub/lofiversion/index.php/t2705.html, "Deleting Your Id From Anothers List", Nov. 18, 2004.*
http://www.phrozensmoke.com/projects/pyvoicechat/gyache-help.html, "Help on Privacy and Stealth Settings".*

* cited by examiner

*Primary Examiner*—Avalon Blenman
(74) *Attorney, Agent, or Firm*—Greenblum &Bernstein, P.L.C.

(57) ABSTRACT

In a message exchange system, a first user and a second user mutually register their handle names (HNs) to their friend lists each provided in a server. When the first user deletes the registration of HN of the second user from the first user's friend list, the first user notifies the second user of the deletion of the HN via the server to request the second user to delete the registration of the first user's HN from the second user's friend list. The HN of the first user is deleted from the second user's friend list.

25 Claims, 18 Drawing Sheets

METHOD FOR REGISTERING USER INFORMATION TO EXCHANGE MESSAGE ON NETWORK

CROSS REFERENCE TO RELATED APPLICATION

The present disclosure relates to subject matter contained in Japanese Patent Application No. 2001-142284, filed on May 11, 2001, the disclosure of which expressly incorporated herein by reference in its entirety.

BACKGROUND OF THE INVENTION

1. Field of the Invention

The present invention relates to a technique for managing user information when exchanging a message between users on a network.

2. Description of the Related Art

There is conventionally known network communication tools that are used to exchange a message between users of client machines connected to a network, typically the Internet. One of such network communication tools is a tool for performing a message exchange between two users in real time on the Internet by unicast (one-to-one communication). For example, there is a two-sided message exchange tool in multiwindow environments as in ICQ (trademark of Milabilis in Israel). The two-sided message exchange tool is one in which the client machines display a transmission message and a reception message respectively to make it possible to perform a message exchange between two sides in a message exchange system in which client machines are connected to an ICQ server.

Each user of such a two-side message exchange tool holds a list in the message exchange system. The list has preregistered information of at least-one user such as friends etc. with whom each user wishes to perform message exchange.

There is a system that requires acceptance from a user desired to be registered when one user of the two-side message exchange tool register& information of the other user to the list. A first user registers information of a second user into the first user's list based on acceptance from the second user. Similarly, the second user registers information of the first user to the second user's list based on acceptance from the first user. The first user cannot register information of the second user in the first user's list Without obtaining the acceptance from the second user.

However, in the case where two users mutually register their information in their lists to use the two-side message exchange tool, even when the first user deletes information of the second user from the first user's list for personal reasons, the second user is not informed that information of the second user has been deleted from the first user's list. The second user recognizes that mutual registration with the first user is continued.

If information of the first user stays registered in the second user's list in spite of the absence of registration information of the second user in the first user's list, there is a possibility that trouble will occurs in consistency of two-side message exchanges. There is a problem in which the first user cannot protect privacy since information of the first user stays registered in the second user's list against the first user's will.

In the system that requires acceptance from a user desired to be registered when one user registers information of the other user in the aforementioned list, the first user must register information of the second user to the first user's list based on acceptance from the second user. Similarly, the second user must register information of the first user to the second user's list based on the acceptance from the first user. This causes a problem in which the mutual registration procedure becomes complicated when two users mutually register their information in their lists.

There is a case in which the second user cannot obtain acceptance from the first user in spite of the fact that the first user registers information of the second user in the first user's list based on acceptance from the second user. In this case, the second user cannot register information of the first user in the second user's list. Namely, information of the second user stays registered in the first user's list in a one-sided manner. This causes a problem in which imbalance will occur in view of protection of privacy.

SUMMARY OF THE INVENTION

It is an object of the present invention is to provide a message exchanging method and the like that are capable of managing user information easily and appropriately.

According to the first aspect of the present invention, there is provided a message exchange system which includes at least a first client system used by a first user and a second client system used by a second user. The client systems are connected to each other via at least one server system and a communication network. Each client system exchanges a message via the server system. The message exchange system includes a storage device that stores a list registering information of one or more users to be subject to message exchange for each user. The first client system includes a first deleting device that deletes registration of information of the second user from the list of the first user based on an instruction from the first user. The first client system further includes a deletion requesting device. When the first deleting device deletes the registration information of the second user from the list of the first user, the deletion requesting device transmits a deletion request message. In response to the registration of information of the first user is deleted from the list of the second user. The second client system includes a second deleting device that deletes the registration information of the first user from the list of the second user, when receiving the deletion request message from the server system.

According to the second aspect of the present invention, there is provided a message exchange system which includes at least a first client system used by a first user and a second client system used by a second user. The client systems are connected to each other via at least one server system and a communication network. Each client system exchanges a message via the server system. The message exchange system includes a storage device that stores a list registering information of one or more users to be subject to message exchange for each user. The first client system includes a first deleting device that deletes registration of information of the second user from the list of the first user based on an instruction from the first user. The first client system further includes a deletion notifying device that transmits a notification of deletion message. The notification indicates that registration of information of the first user is deleted from the list of the second user. The message is sent to the second client system via the server system when the first deleting device deletes the registration of information of the second user from the first list of the first user.

According to the third aspect of the present invention, there is provided a client system that exchanges a message with another client system via a server system connected to a communication network. The client system includes a deleting device that deletes registration of information of a second user from a list of a first user based on an instruction from the first user of the client system. The client system further includes a deletion requesting device that transmits a deletion request message for deleting the registration of information of the first user from the list of the second user. The message is sent to the other client system used by the second user via the server system when the deleting device deletes the registration of information of the first user from the list of the second user.

According to the fourth aspect of the present invention, there is provided a client system that exchanges a message with another client system via a server system connected to a communication network. The client system includes a receiver that receives a deletion request message for deleting registration of information of a first user from a list of a second user, who uses the client system, from the server, system. The client system further includes a deleting device that deletes the registration information of the first user from the list of the second user when the receiving device receives the deletion request message.

According to the fifth aspect of the present invention, there is provided a message exchange method of a message exchange system. In the message exchange system, at least a first client system used by a first user and a second client system used by a second user are connected to each other via at least one server system and a communication network. Each client system exchanges a message via the server system. The method includes preparing a list for registering information of one or more users to be subject to message exchange for each user. The method further includes deleting registration of information of the second user from the list of the first user based on an instruction from the first user by use of the first client system. The method further includes transmitting a deletion request message for deleting the registration of information of the first user from the list of the second user, to the second client system via the server system. The message is sent to the first client system when information of the second user is deleted from the list of the first user. The method further includes deleting the registration information of the first user from the list of the second user by use of the second client system when the second client system receives the deletion request message from the server system.

According to the sixth aspect of the present invention, there is provided a message exchange method of a message exchange system. In the message exchange system, at least a first client system used by a first user and a second client system used by a second user are connected to each other via at least one server system and a communication network. Each client system exchanges a message via the server system. The method includes preparing a list for registering information of one or more users to be subject to message exchange for each user. The method further includes deleting registration of information of the second user from the list of the first user based on an instruction from the first user by use of the first client system. The method further includes transmitting a notification of deletion message notifying that the registration of information of the first user is deleted from the list of the second user. The message is sent to the second client system via the server system of the first client system when information of the second user is deleted from the list of the first user.

According to the seventh aspect of the present invention, there is provided a message exchange method, which is executed by a client system. The client system exchanges a message with another client system via a server system connected to a communication network. The method includes deleting registration of information of a second user from a list of a first user based on an instruction from the first user of the client system. The method further includes transmitting a deletion request message for deleting the registration of information of the first user from the list of the second user. The message is sent to the other client system used by the second user via the server system when the registration information of the first user is deleted.

According to the eighth aspect of the present invention, there is provided a message exchange method, which is executed by a client system. The client system exchanges a message with another client system via a server system connected to a communication network. The method includes receiving a deletion request message for deleting registration information of a first user from a list of a second user, who uses the client system, from the server system. The method further includes deleting the registration information of the first user from the list of the second user when the message is received.

According to the ninth aspect of the present invention, there is provided a client system that exchanges a message with another client system via a server system connected to a communication network. The client system includes storage that stores a program, a processor that executes the program, and a communication device that communicates with the server system via the communication network. The program causes the client system to delete registration of information of a second user from a list of a first user based on an instruction from the first user of the client system. The program further causes the client system to transmit a deletion request message for deleting the registration of information of the first user from the list of the second user to the other client system used by the second user via the server system when the registration information of the second user is deleted.

According to the tenth aspect of the present invention, there is provided a client system that exchanges a message with another client system via a server system connected to a communication network. The client system includes storage that stores a program, a processor that executes the program, and a communication device that communicates with the server system via the communication network. The program causes the client system to receive from the server system a deletion request message for deleting registration information of a first user from a list of a second user, who uses the client system. The program further causes the client system to delete the registration information of the first user from the list of the second user when the message is received.

According to the eleventh aspect of the present invention, there is provided a message exchange system. In the message exchange system, at least a first client system used by a first user and a second client system used by a second user are connected to each other via at least one server system and a communication network. Each client system exchanges a message via the server system. The message exchange system includes a storage device that stores a list for each user in which information is registered. The information relates to one or more users to be subject to message exchange. The first client system includes a requesting device that transmits a registration request message for registering information of the second user to the list of a first user based on an instruction from the first user. The message is sent to the second client user via the server system. The first client system further includes a receiver that receives a message from the second client system in response to the registration request message. The second client system includes a registering device that registers information of the first user to the list of the second user based on an instruction from the second user when the registration request message is received. The second client system further includes a registration notifying device that transmits a mutual registration message to the first client system via the server system when information of the first user is registered by the registering device. The first client system further includes a mutual registering device that registers information of the second user to the list of the first user when the receiver receives the mutual registration message.

According to the twelfth aspect of the present invention, there is provided a client system that exchanges a message with another client system via a server system connected to a communication network. The client system includes a receiver that receives a registration request message for registering information of a second user to a list of a first user, who uses the other client system, from the server system. The client system further includes a registering device that registers information of the first user to the list of the second user based on an instruction from the second user when the receiver receives the registration request message. The client system includes a registration notifying device that transmits a mutual registration message to the other client system via the server system when information of the first user is registered by the registering device.

According to the thirteenth aspect of the present invention, there is provided a message exchange method of a message exchange system. In the message exchange system, at least a first client system used by a first user and a second client system used by a second user are connected to each other via at least one server system and a communication network. Each client system exchanges a message via the server system. The method includes preparing a list for registering information of one or more users to be subject to message exchange for each user. The method further includes transmitting a registration request message for registering information of a second user to the list of a first user based on an instruction from the first user. The message is sent to the second client user via the server system by the first client system. When the second client system, receives the registration request message, information of the first user is registered to the list of the second user based on an instruction from the second user. When information of the first user is registered, a mutual registration message is transmitted to the first client system via the server system. When the first client system receives the mutual registration message, information of the second user is registered to the list of the first user.

According to the fourteenth aspect of the present invention, there is provided a message exchange method that is executed by a client system. The client system exchanges a message with another client system, via a server system connected to a communication network. The method includes receiving a registration request message for registering information of a second user to a list of a first user, who uses the other client system, from the server system. When the registration request message is received, information of the first user is registered to the list of the second user based on an instruction from the second user. When information of the first user is registered, a mutual registration message is transmitted to the other client system via the server system.

According to the fifteenth aspect of the present invention, there is provided a client system that exchanges, a message with another client system via a server system connected to a communication network. The client system includes storage that stores a program, a processor that executes the program, and a communication device that communicates with the server system via the communication network, The program causes the client system to receive a registration request message for registering information of a second user to a list of a first user, who uses the other client system, from the server system. The program further causes the client system to register information of the first user to the list of the second user based on an instruction from the second user when the registration request message is received. The program further causes the client system to transmit a mutual registration message to the other client system via the server system when information of the first user is registered.

The message exchange method of the present invention can be provided as a program that is executed in a client system accessible to a server connected to a communication network. As a method for providing a program, there is a method in which a program is stored in a computer-readable storage medium such as CD-ROM, DVD-ROM, etc. so that the program is distributed, and a method in which a program is converted into a signal and superimposed on a carrier wave so that the program is downloaded to a client system from a server system.

DETAILED DESCRIPTION OF THE PREFERRED EMBODIMENTS

Figure 1:
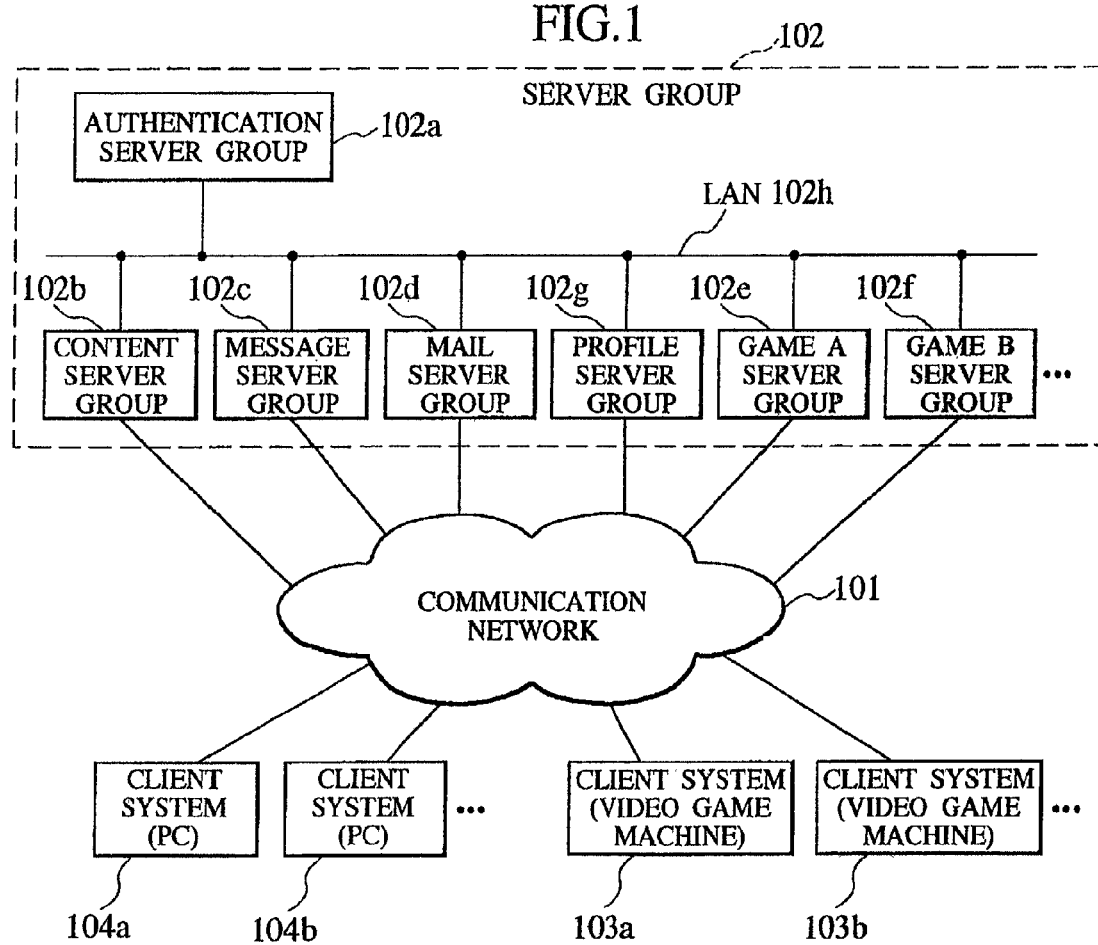
FIG. 1 is a block diagram illustrating a system structure of a communication network service system according to one embodiment of the present invention.

The following will specifically explain the embodiments of the present invention with reference to the accompanying drawings. In the respective figures, the components having the same functions are assigned the same reference numerals and the overlapping explanation is omitted.

The message exchange system of this embodiment is implemented as one of the functions in the network service that the network service company provides. The network service system of this embodiment is a system for providing the network service to member users via the Internet as one example of communication networks.

For example, the contents of the aforementioned network service may be as follows.
 1. Content browsing service: Provision of information of sports, music, cartoon, shopping, and other kinds of information;
 2. Communication service: Provision of environment of real-time message exchange between users and mail service environments; and
 3. Game service: Provision of on-line games that are started up via the network.

The real-time message exchange between users is implemented in the message exchange system of this embodiment.

The user, who becomes the member of the network service, causes a viewer intended for the network service to be initiated on a client machine, and gains access to server groups of network service companies to use various kinds of network services to be provided.

EMBODIMENT

System Structure

The system structure of the network service system of this embodiment is illustrated in FIG. 1. In FIG. 1, the network service system includes a communication network 101, a server group 102 of network service company, and client systems 103*a*, 103*b*, 104*a*, 104*b*, which are connected to the server group 102 via the communication network 101 and which are used by each one of the users. The server group 102 and client systems 103*a*, 103*b*, 104*a* and 104*b* are computer systems.

The client systems 103*a* and 103*b* are video game machines intended for home use The client systems 104*a* and 104*b* are personal computers (hereinafter referred to as PCs), The client systems 103*a* and 103*b* can load the aforementioned viewer program from CD-ROM. The client systems 104*a* and 104*b* have the aforementioned viewer installed thereon in advance.

The communication network 101 connects the server group 102 to the client systems 103*a*, 103*b*, 104*a*, and 104*b*. In this embodiment, it is assumed that the Internet is used as the communication network 101. For data transmission/reception, general protocols such as TCP/IP, HTTP (HyperText Transfer Protocol), SMTP (Simple Mail Transfer Protocol), FTP (File Transfer Protocol), etc. are used.

The server group 102 performs access to data held and the processing, and provides service to the respective client systems 103*a*, 103*b*, 104*a*, and 104*b* in response to the requests from the respective client systems 103*a*, 103*b*, 104*a*, and 104*b*. The server group 102 has an authentication server group 102*a*, a content server group 102*b*, a message server group 102*c*, a mail server group 102*d*, a game A server group 102*e*, a game B server group 102*f*, and a profile server group 102*g*. The respective server groups 102*a* to 102*g* are connected to one another via a LAN 102*h*.

The authentication server group 102*a* includes multiple authentication server systems. Each authentication server system manages an account (user ID) and a password of each member user. Each authentication server system may manage a user connection state (online/offline) and an address of the user's client machine, which is online.

The content server group 102*b* includes multiple content server systems. Each content server system provides information of sports, music, cartoons, and shopping, as well as other kinds of information.

The message server group 102*c* includes a group of message server systems. Each message server system provides an environment of real-time message exchange between users. More specifically, each message server system provides the environment of a messenger application (serving as a structural component of the message exchange system of this embodiment to be described later) that the user starts up on the client machine, and an environment of a chat application. Each message server system executes routing (setting of transmission destination and channel) for distributing an exchange message of the messenger application and a chat message of the chat application.

The mail server group 102*d* includes a group of mail server systems. Each mail server system provides the environment of e-mail exchange between users.

The game A server group 102*e* is composed of a group of game A server systems for a game, that is, game title "A." The game B server group 102*f* is composed of a group of game B server systems for a game, that is, game title "B." The respective game server systems are used as structural components of an online information processing system of this embodiment. Each game server system provides the environments of online games. The user starts up the online game in the game server system from the viewer to lay the game that the game server system provides. For example, in the case where the started online game is a role playing game (user plays a role as a game character to execute the game), the user can play the role playing game with other players.

The profile server group 102*g* includes a group of profile server systems. Each profile server system manages the profiles of the user corresponding to each account on an account-by-account basis. The user can register the user's profiles to the profile server system from the viewer.

The profile server system stores friend list data, which is necessary for the viewer to display the friend list. Friend list data is a list in which information of at least one user with whom the user corresponding to each account wishes to perform a message exchange is registered for each account. The friend list is prepared in advance at the time when the operation of the system is started. The profile server system stores a handle name of a user corresponding to each account on an account-by-account basis. The friend list (friend list data) and the handle name will be specifically described later.

Client System

This embodiment explains a case in which the client systems 103a and 103b, which are video game machines intended for home use, are used as client systems.

Figure 2:
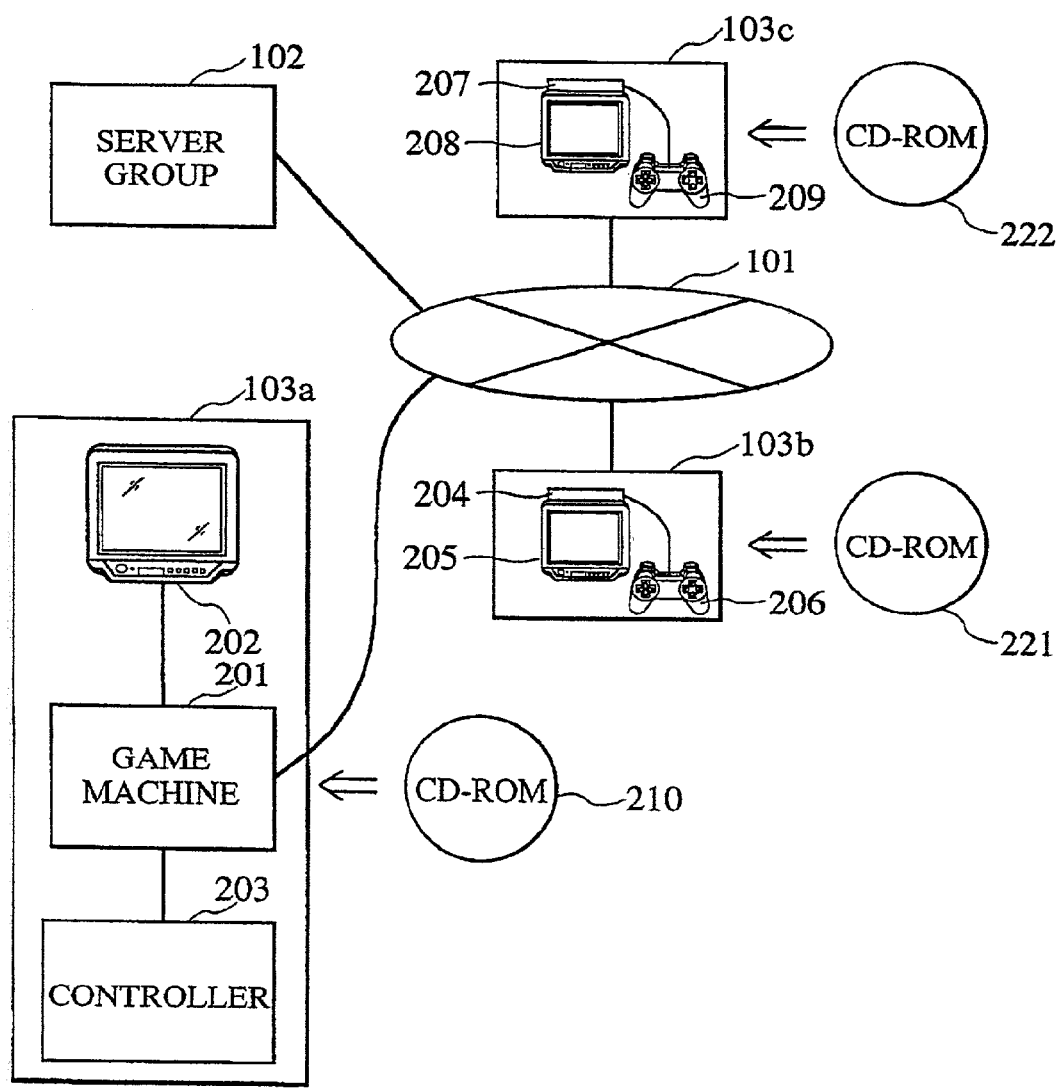
FIG. 2 is an explanatory view of an environment of video game machines intended for home use according to an embodiment of the present invention.

FIG. 2 is a view explaining environments of client systems 103a, 103b and 103c which are video game machines intended for home use. The client systems 103a, 103b and 103c are connected to the server group 102 via the communication network 101.

The client system 103a includes a game machine main body 201, a TV set 202, and a controller 203. The client system 103b includes a game machine main body 204, a TV set 205, and a controller 206. The client system 103c includes a game machine main body 207, a TV set 208, and a controller 209. Programs that are executed by the game machine main bodies 201, 204 and 207 are provided by CD-ROMs 210, 221, and 222.

The game machine main body 201 starts up the viewer and gains access to the server group 102. The TV, set 202 displays an image sent from the game machine main body 201, and outputs sound. The controller 203 inputs an instruction from the user to the game machine main body 201.

In this embodiment, it is assumed that users, that is, MAEHIRO, JUNKO, and NAOKI gain access to the server group 102 using client systems 103a, 103b, and 103c, respectively.

Figure 3:
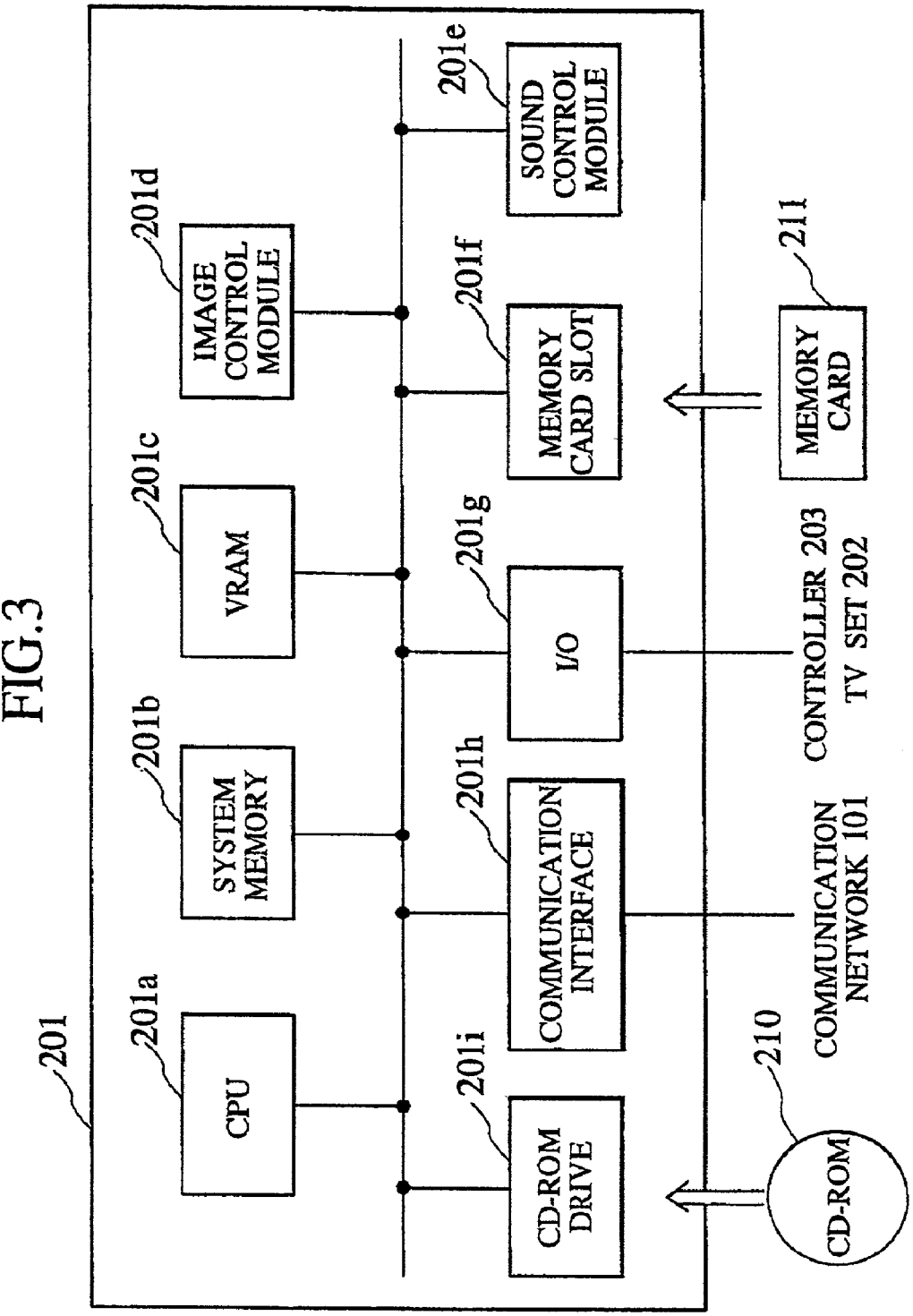
FIG. 3 is a block diagram illustrating the system structure of the main body of a game machine according to an embodiment of the present invention.

FIG. 3 shows the system structure of the game machine main body 201. In FIG. 3, the game machine main body 201 includes a CPU (Central Processing Unit) 201a, system memory 201b, a VRAM (Video RAM) 201c, an image control module 201d, a sound control module 201e, a memory card slot 201f, an I/O (Input/Output) interface 201g, a communication interface 201h, and a CD-ROM drive 201i. A CD-ROM 210 is loaded in the CD-ROM drive 201i. A memory card 211 is loaded in the memory card slot 201f.

The CPU 201a controls the entirety of the game machine main body 201 according to the control procedures of the program loaded on the system memory 201b from the CD-ROM 210 or the program prestored.

The system memory 201b includes ROM (Read Only Memory), and RAM (Random Access Memory). In the ROM, a BIOS (Basic Input/Output System) program is stored. In the RAM control data and a viewer program, which is loaded from the CD-ROM 210 by the CD-ROM drive 201i, are temporarily stored.

The VRAM 201c develops image data to be displayed on the TV set 202, and temporarily stores it. The image control module 201d controls image data to be displayed on the TV set 202. The sound control module 201e controls sound data to be output from the TV set 202.

The memory card slot 201f is an interface for inserting the memory card 211 that stores data to which the CPU 201 a refers at the time of starting up the viewer.

The I/O interface 201g performs data input/output between the external device such as the TV set 202 or the controller 203 and the game machine main body 201. The communication interface 201h performs communication control with the server group 102 via the communication network 101.

The CD-ROM drive 201i drives the CD-ROM 210 and reads the program stored in the CD-ROM 210. In this embodiment, the viewer program stored in the CD-ROM 210 is read by the CD-ROM drive 201i and loaded onto the RAM of the system memory 201b.

The game machine main body 204 of the client system 103b and the game machine main body 207 of the client system 103c have the same functions as those of the game machine main body 201 of the client system 103a, and the structure as illustrated in FIG. 3. Programs are loaded on the game machine main bodies 204 and 207 from the CD-ROMs 221 and 222.

Figure 4:
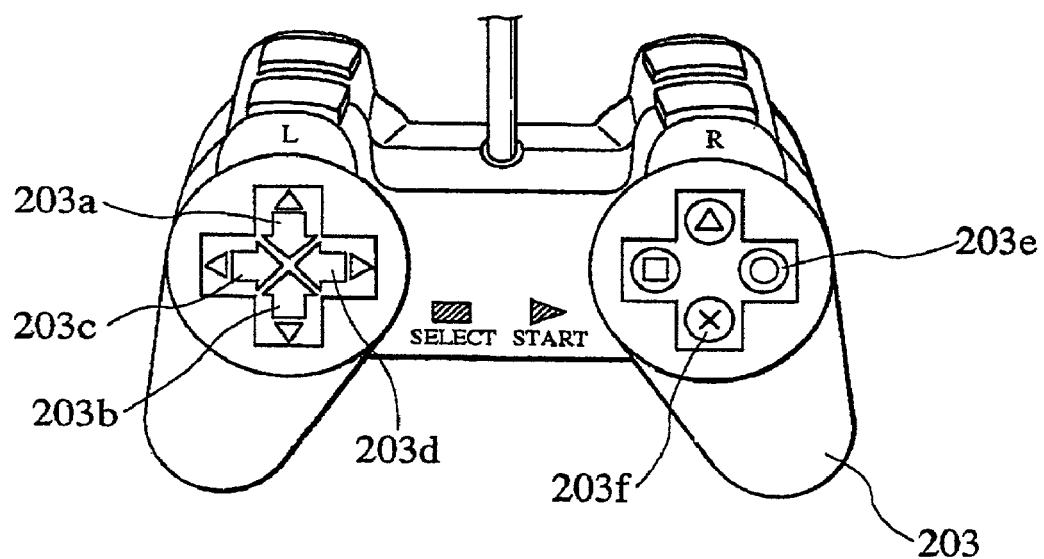
FIG. 4 is an explanatory view of a controller according to an embodiment of the present invention.

FIG. 4 shows the controller 203. Reference numerals 203a, 203b, 203c, and 203d are directional keys of upper, lower, left and right, respectively. Reference numeral 203e indicates a circle button, and 203f indicates a cross button. The user presses these keys and buttons 203a to 203f to provide a predetermined instruction to the game machine, main body 201.

The directional keys 203a, 203b, 203c, and 203d are used to move a cursor, which is instructed by a focus (highlight for designating an item)on the viewer screen page displayed on the TV set 202, to the corresponding direction. The directional keys 203a, 203b, 203c, and 203d are also used to move a player character to a desired direction in the field of game.

The circle button 203e is a button with which the cursor provides a decision operation to a certain item decision operation. The cross button 203f is a button that is used to cancel the decision operation or return to one previous operation step.

The controller 206 of the client system 103b and the controller 209 of the client system 103c also have the same functions as those of the controller 203c of the client system 103a, and the structure as illustrated in FIG. 4.

Though the client systems 104a and 104b, which are PCs, are slightly different from the client systems 103a and 103b, which are video game machines, in view of the physical structure, they can be implemented as those equivalent to the client systems 103a and 103b in view of the functional structure.

Friend List Deletion Processing

With reference to FIGS. 5 to 12, the following will explain a case in which MAEHIRO deletes JUNKO's HN (Handle Name) "junko", who uses the client system 103b, from his friend list by use of client system 103a in the system structure of FIGS. 1 to 4. The part that is described as viewer processing in the following explanation is processing which is actually carried out when the CPU 201a executes the viewer program.

When MAEHIRO sets the CD-ROM with the viewer program stored on the game machine main body 201, the game machine main body 201 initiates the viewer. The same processing is also carried out in the game machine main bodies 204 and 207.

An initial screen page of the viewer prompts for an account and a password to log in. The user inputs the account and the password from a software keyboard (not shown in the figure: keyboard displayed on the screen page) or an external keyboard (not shown in the figure), and performs a decision operation with the circle button 203e to log in the viewer.

The viewer of Embodiment 1 can use four accounts including one master account for logging in and three sub-accounts. It is assumed that MAEHIRO logs in by use of account "maehiro" as a master account.

Figure 5:
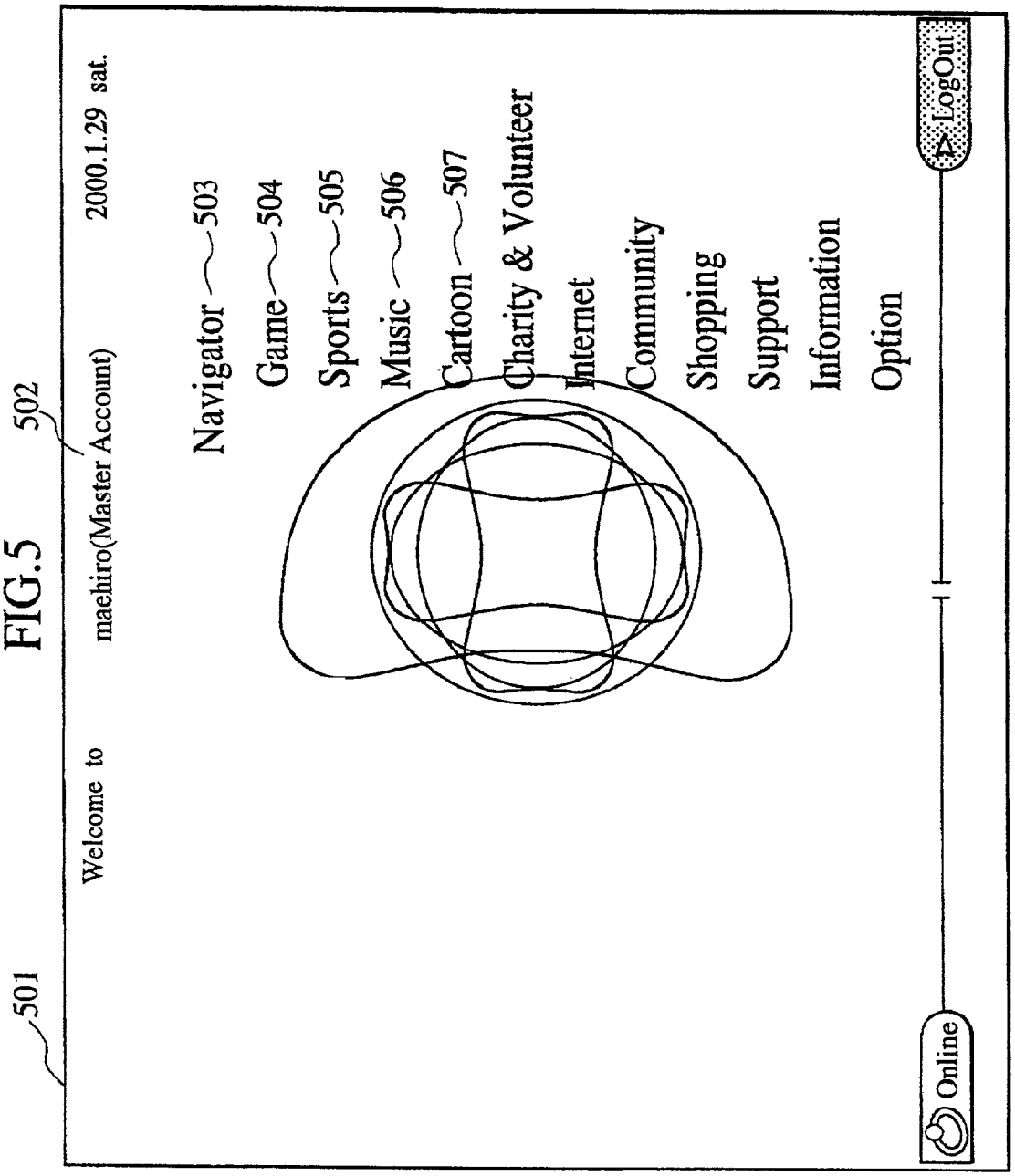
FIG. 5 is an explanatory view of a top screen page of a viewer according to an embodiment of the present invention.

FIG. 5 shows the screen view of the logged-in viewer in this case. In FIG. 5, a viewer menu screen page 501 includes an account 502, a navigator command button 503, a game command button 504, a sports command button 505, a music command button 506, and a cartoon button 507. At this time, the viewer is offline to the server group 102.

The user operates the directional keys 203a to 203d of the controller 203 to cause a desired button to move the cursor, and performs the decision operation with the circle button 203e. The viewer starts up the function associated with the button subject to the decision operation. The user provides the decision operation to a certain item at which the cursor is placed, making it possible to start up the function associated with the item.

When the user adjusts the cursor to the game command button 504 to perform the decision operation, the viewer gains access to the game A server group 102e or the game B server group 102f to initiate a game tool for playing the game.

When the user adjusts the cursor to the sports command button 505, the music command button 506, the cartoon command button 507, etc. to perform the decision operation, the viewer gains access to the content server group 102b to initiate a content browsing tool for obtaining various kinds of contents information.

When the user adjusts the cursor to the navigator command button 503 to perform the decision operation, the viewer gains access to the message server group 102c, the mail server group 102d and the profile server group 102g to initiate a communication tool "Navigator" for providing a communication service. The navigator is a communication tool in which the functions such as a messenger application hereinafter simply referred to as messenger), a chat application and a mail application are integrated.

The following will explain a case in which the navigator is initiated in the game machine main body 201. When the navigator is started up, the navigator gains access to the server group 102 with the account and the password used to log in the viewer, and requests authentication. When authentication is obtained at the server group 102, the viewer is online to the server group 102.

Figure 6:
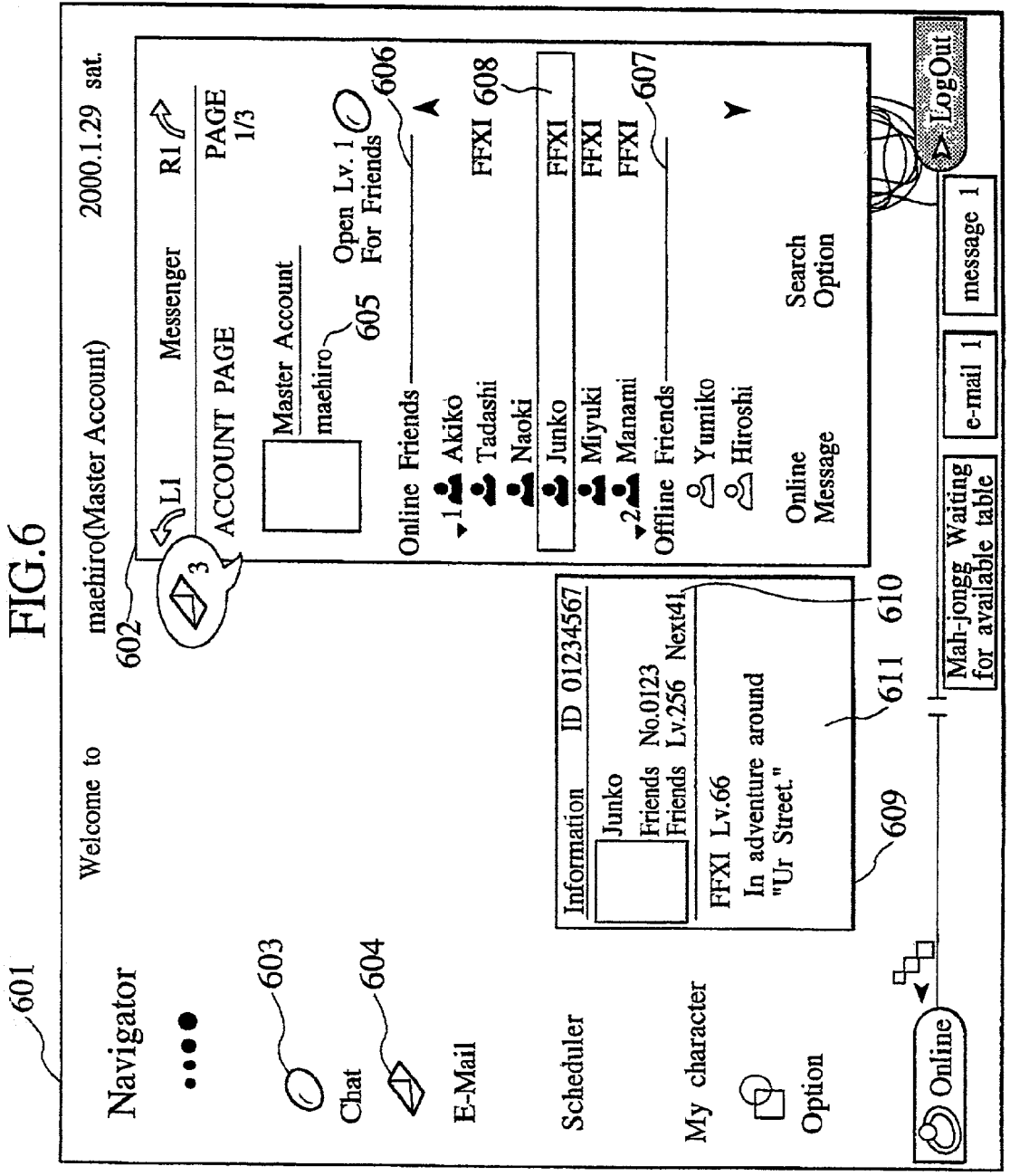
FIG. 6 is an explanatory view of a navigator top screen page according to an embodiment of the present invention.

FIG. 6 shows a viewer screen page when the navigator command button 503 is subject to the decision operation to start up the navigator. In FIG. 6, the navigator top screen page 601 has a main window 602 of the messenger, a chat command button 603, and a mail command button 604.

The messenger is automatically started up just after the navigator is initiated. The viewer is online to the message server group 102c, and the main window 602 of the messenger is displayed in the viewer. The messenger is a communication tool that gains access to the message server group 102c to monitor the connection state of the member users to the server group 102 and perform a real-time message exchange between two users that are online to each other.

When the user adjusts the cursor to the mail command button 604 to perform the decision operation, the messenger gains access to the mail server group 102d to start up a mail application for performing an e-mail exchange.

When the user adjusts the cursor to the chat command button 603 to perform the decision operation, the messenger gains access to the message server group 102c to start up a chat application for performing a chat.

In the messenger shown in FIG. 6, MAEHIRO selects the other user from the main window 602, so that he can perform a one-to-one real-time message exchange with the selected user.

The following will specifically explain the messenger. As illustrated in FIG. 6, the main window 602 of the messenger displays the friend list. The friend list is one that is displayed in the main window 602 when the messenger obtains friend list data stored in the profile server system.

The friend list is one that displays handle names (hereinafter referred to as HNs) of the respective users as friends based on account friend list data (to be described later). Namely, in the account friend list data, the handle names of the member users with whom MAEHIRO has become acquainted via an online game are set and registered as friends in advance to be associated with an account "maehiro." HN is a temporary name that the user has, and the user can participate in the game and transmits the message by use of HN. In Embodiment 1, MAEHIRO's HN is the same as the account "maehiro" to simplify the explanation.

In the case where MAEHIRO deletes the registration of JUNKO's HN "junko", who uses the client system 103b, from his friend list, the messenger notifies JUNKO's client system 103b that the HN "junko" has been deleted. In addition, the messenger requests JUNKO's client system 103b to delete the registration of his HN "maehiro" from JUNKO's friend list. In this way, one feature of the message exchange system of Embodiment 1 lies in the point that the HNs can be mutually deleted from the respective friend lists.

As illustrated in FIG. 6, the main window 602 of the messenger includes an account 605 and online friends 606 and offline friends 607 as a friend list. The online friends 606 display the HNs of the friend list, which are currently online to the server group 102. The offline friends 607 display the HNs of the friend list, which are currently offline to the server group 102. The online friends 606 further display the online user's circumstances, for example, a name of an online game currently in use.

In the case where the HN of JUNKO, who uses the client system 103b, is "junko" and is registered in friend list data of the account "maehiro", the online friends 606 displays the HN "junko."

A HN "junko" 608, which is indicated by the cursor in the online friend 606 shows that JUNKO is playing the online game FFXI.

When the user moves the cursor in the friend list on the main window 602 of the messenger, the messenger displays information of the user with HN, which is indicated by the cursor, in an information window 609. In an example of FIG. 6, information of JUNKO with HN "junko" indicated by the cursor is displayed in the information window 609. The information window 609 displays JUNKO's simple profile 610 of HN "junko" and a user state 611 (for example, a title of online game currently in use).

Information on the point that the users with the respective HNs in the friend list are in an online/offline state and information on the user's state when online are obtained when the messenger gains access to the message server group 102c to monitor them all the time.

Figure 7:
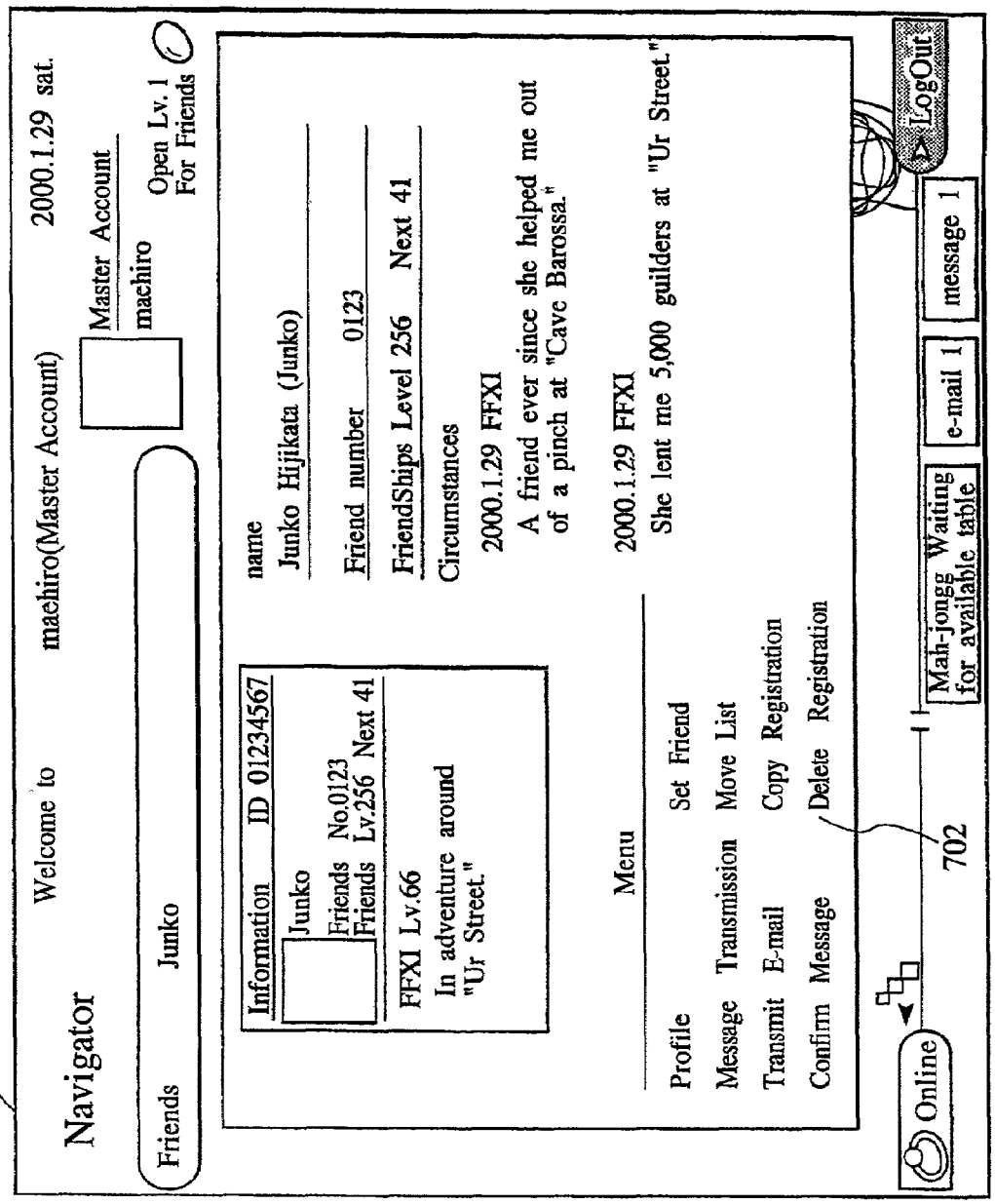
FIG. 7 is an explanatory view of a friend screen page according to an embodiment of the present invention.

In FIG. 6, when the user adjusts the cursor to the HN "junko" 608 to perform the decision operation, the viewer displays a screen page that instructs various kinds of sub-commands to JUNKO with the account "junko." FIG. 7 shows a friend screen page for instructing various kinds of sub-commands to JUNKO of HN "junko."

Figure 8:
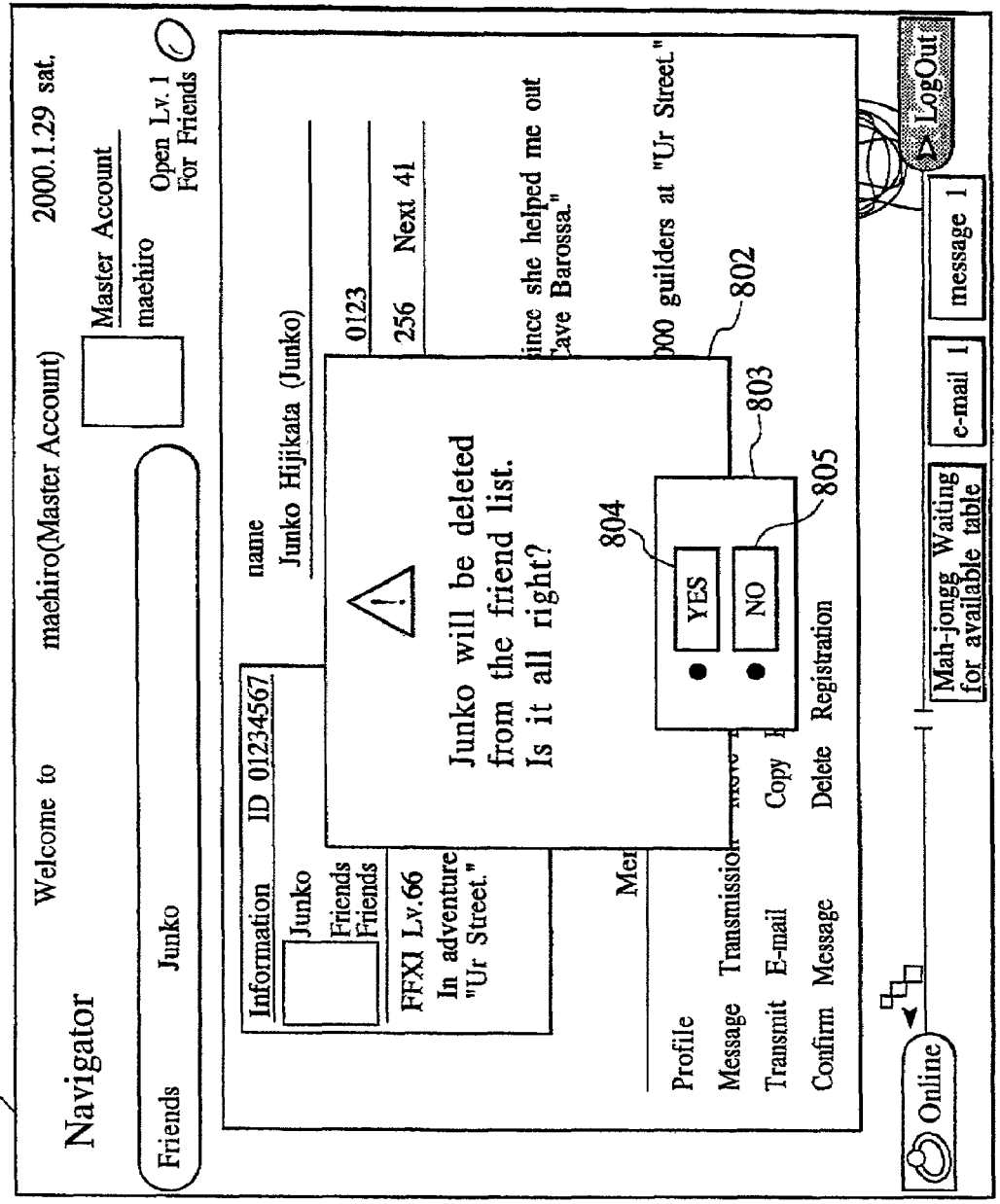
FIG. 8 is an explanatory view of a friend screen page according to an embodiment of the present invention.

When the user adjusts the cursor to a registration deletion command button 702, which is one of the sub-commands, to perform the decision operation, the messenger inquires of MAHIRO about the deletion of HN "junko" from the friend list of the account "maehiro." FIG. 8 shows a screen page of the viewer in connection with an inquiry about the deletion of the friend list of the messenger.

In FIG. 8, a friend screen page 801 has a warning window 802, a selection window 803, and the like. The warning window 802 displays an inquiry about the point that "Junko will be deleted from the friend list. Is it all right?" The following will explain a case in which MAEHIRO adjusts the cursor to a "YES" button 804 in the selection window 803 to perform the decision operation.

When MAEHIRO adjusts the cursor to the "YES" button 804 in the selection window 803 to perform the decision operation, the messenger sends the profile server system an instruction to delete HN "junko" from the friend list with the account "maeheiro." The profile server system performs processing for deleting "junko" from friend list data of "maehiro" based on this instruction.

Figure 9:
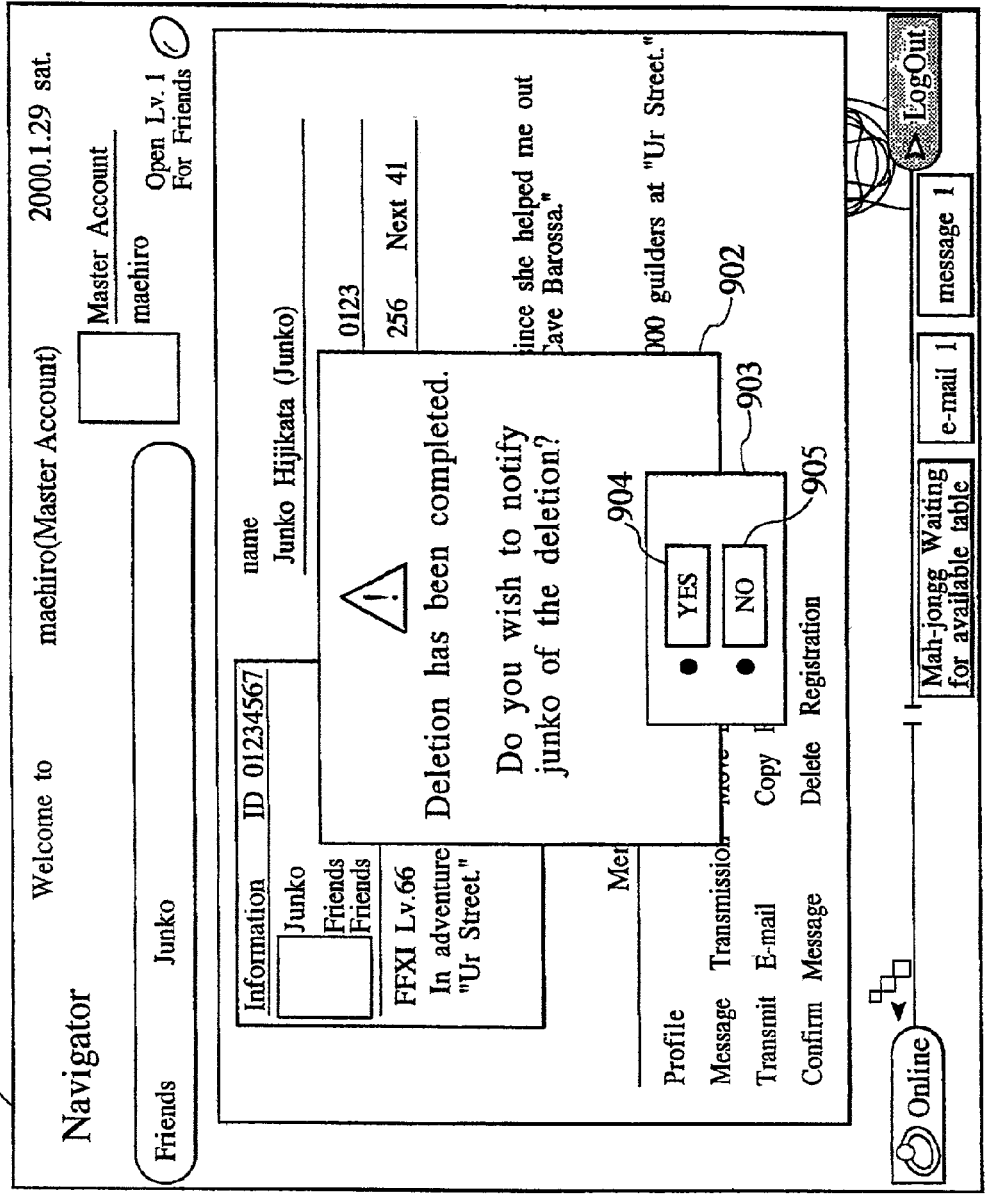
FIG. 9 is an explanatory view of a friend screen page according to an embodiment of the present invention.

FIG. 9 shows a screen page of the viewer in which HN "junko" has been deleted from the friend list with account "maehiro."

In FIG. 9, a friend screen page 901 has a warning window 902, a selection window 903, and the like. The warning window 902 displays an inquiry about the point that "Deletion has been completed. Do you wish to notify junko of the deletion?" The following will explain a case in which MAEHIRO adjusts the cursor to a "YES" button 904 in the selection window 903 to perform the decision operation.

Figure 10:
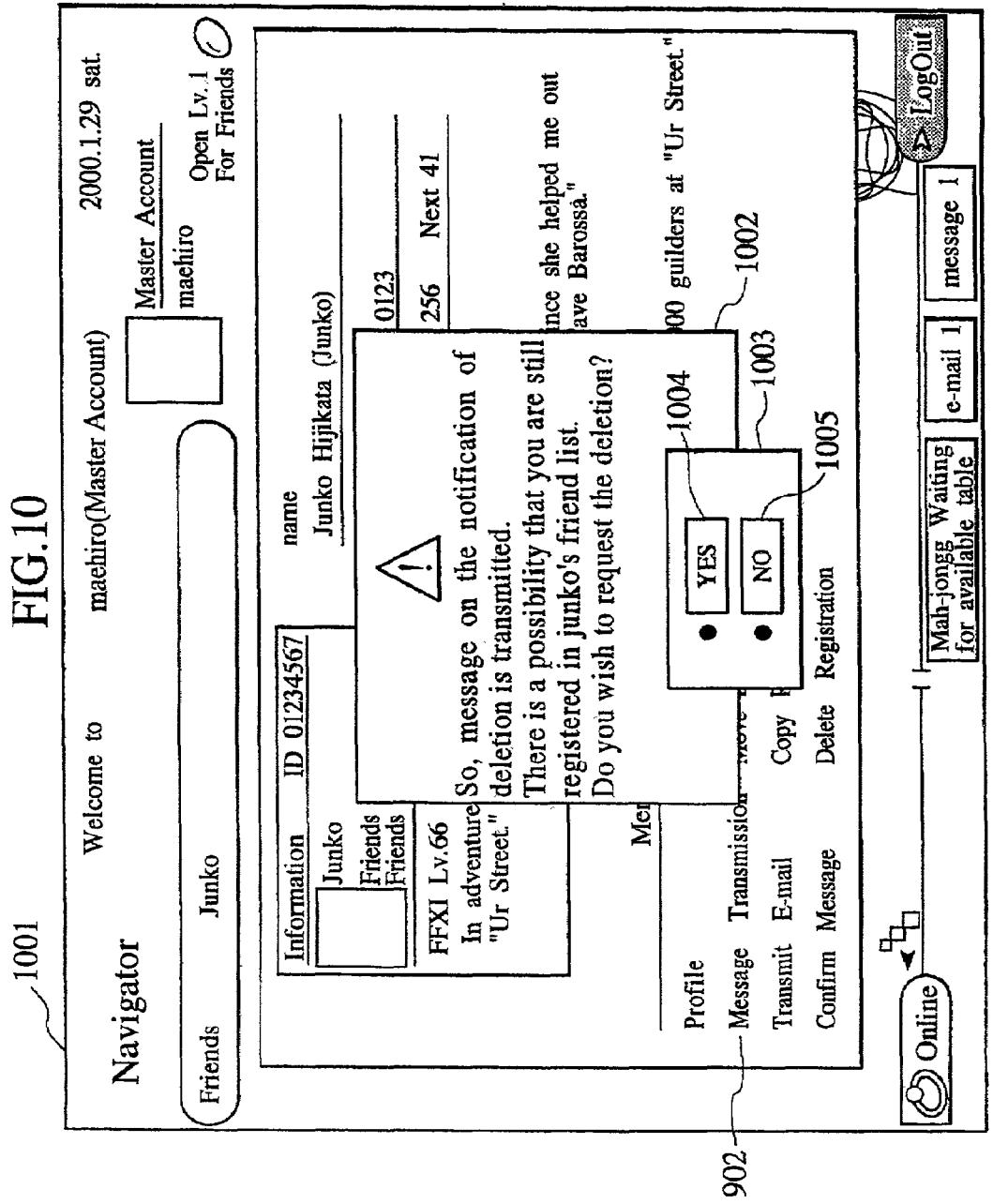
FIG. 10 is an explanatory view of a friend screen page according to an embodiment of the present invention.

When MAEHIRO adjusts the cursor to a "YES" button 904 to perform the decision operation, the messenger notifies JUNKO of the fact that the deletion has been made. At the same time, the messenger inquires of MAHIRO about the transmission of a notification of deletion message and deletion request for requesting to delete the registration of his HN "maehiro" from JUNKO's friend list. FIG. 10 shows a screen page of the viewer in connection with the inquiry about the notification of deletion message and deletion request sent from the messenger.

In FIG. 10, a friend screen page 1001 has a warning window 1002, a selection window 1003, and the like. The warning window 1002 displays an inquiry about the point "So, message on the notification of deletion is transmitted. There is a possibility that you are still registered in the junko's friend list. Do you wish to request the deletion?" The following will explain a case in which MAEHIRO adjusts the cursor to a "YES" button 1004 in the selection window 1003 to perform the decision operation.

Figure 11:
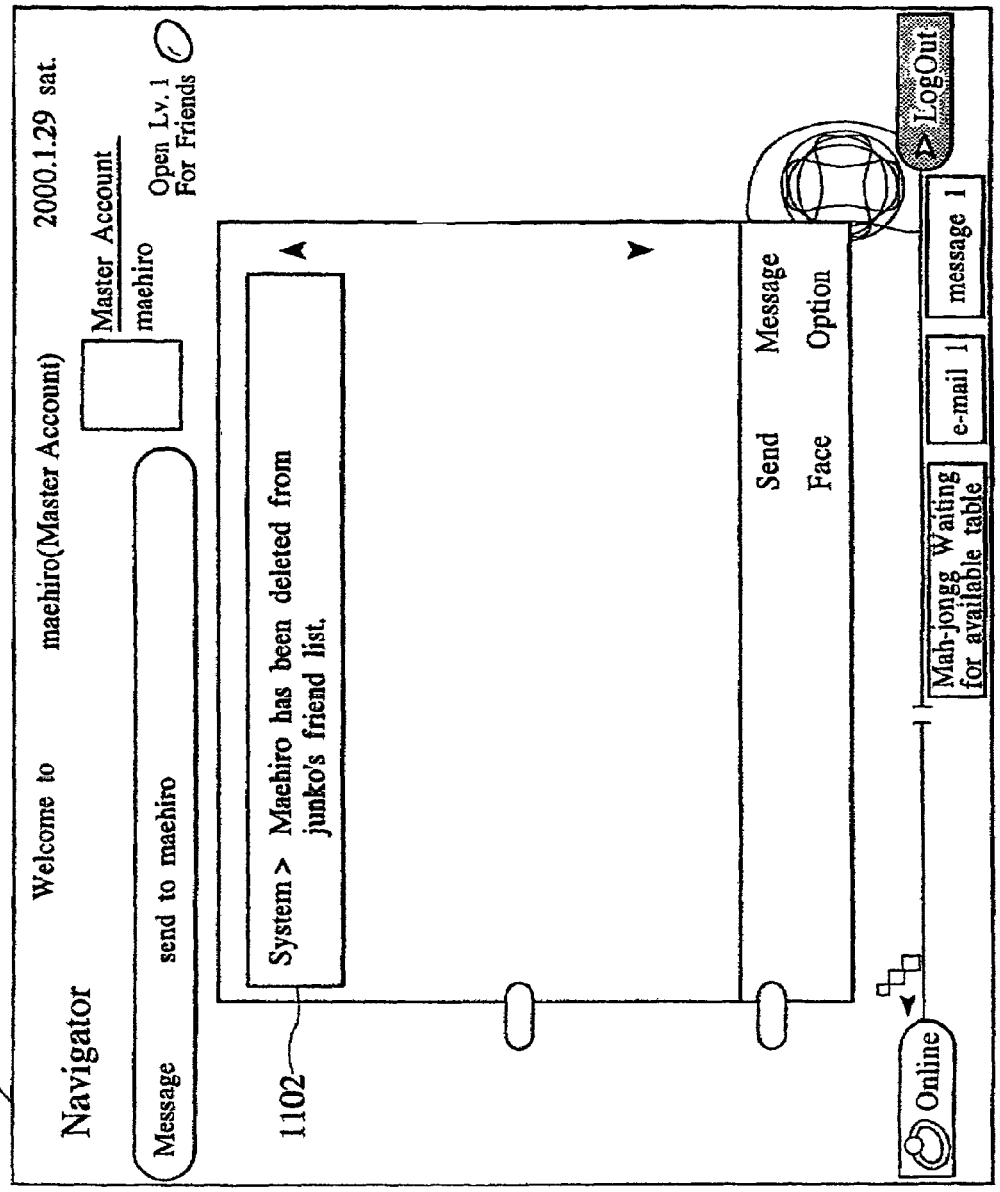
FIG. 11 is an explanatory view of a message screen page according to an embodiment of the present invention.

When MAEHIRO adjusts the cursor to a "YES" button 1004 to perform the decision operation, the messenger sends JUNKO's client system 103b the notification of deletion message and the deletion request via the message server system. After sending the notification of deletion message and the deletion request, the messenger moves to a message mode for receiving an autonomous message about the fact that the registration of his HN "maehiro" from JUNKO's friend list has been deleted from the profile server. FIG. 11 shows a message display screen page that is displayed on the viewer when the MAEHIRO's messenger receives the autonomous message from the message server system in the message mode. The details of the viewer on which the autonomous message is displayed will be described later.

Figure 12:
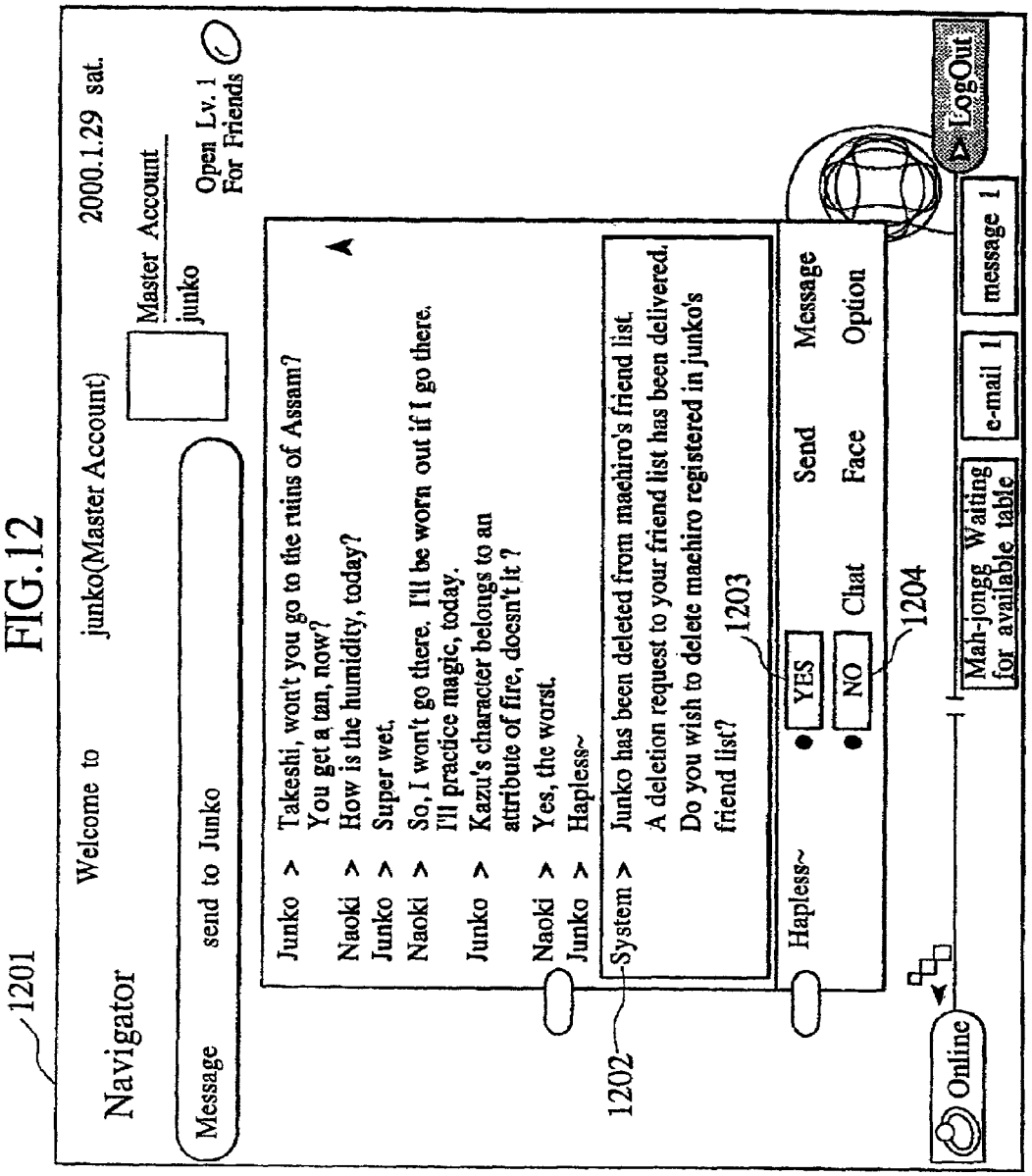
FIG. 12 is an explanatory view of a message screen page according to an embodiment of the present invention.

It is assumed that JUNKO, who uses the client system 103b, initiates the messenger using the game machine main body 204 to be put into the message mode where the message exchange with NAOKI of HN "naoki" is performed in real time. FIG. 12 shows a screen page of the viewer in the message mode of JUNKO's messenger.

In FIG. 12, a message screen page 1201 shows a case in which JUNKO with HN "junko" receives an autonomous message using the notification of deletion message and deletion request sent by MAEHIRO from the message server system during the message exchange with NAOKI with HN "naoki."

The message screen page 1201 has an autonomous message 1202, a choice "YES" button 1203, a choice "NO" button 1204 and the like. The autonomous message 1202 displays an inquiry about the point "JUNKO has been deleted from MAEHIRO's friend list. A deletion request to your friend list has been delivered. Do you wish to delete maehiro registered in the JUNKO's friend list?" The following will explain a case in which JUNKO adjusts the cursor to the choice "YES" button 1203 to perform the decision operation.

When JUNKO adjusts the cursor to the choice "YES" button 1203 to perform the decision operation, the messenger sends MAEHIRO's client system 103a a message on a mutual deletion completion via the message server system. The messenger sends the profile server system an instruction including the point that HN "maehiro" is deleted from JUNKO's friend list. The profile server system performs processing for deleting "maehiro" from JUNKO's friend list based on this instruction.

A message screen page 1101 of FIG. 11 displays an autonomous message 1102 from the message server system using the message on the mutual deletion completion in which the registration of MAEHIRO's HN "maehiro" from JUNKO's friend list has been deleted, namely, "Maehiro has been deleted from the junko's friend list."

Client System Processing

An explanation will be given of processing procedures, which are executed when MAEHIRO deletes JUNKO's HN, who uses the client system 103b, from his friend list with reference to data contained in the memory card of FIG. 13, the profile database of FIG. 14 and flowcharts of FIGS. 15 and 16.

The respective HNs of a transmitting side and a receiving side are included in a message header of a message to be transmitted/received between the client systems. In the message exchange system, the server group 102 and the client systems 103a and 103b can recognize the transmitter and the receiver of the message according to the HNs included in the message header.

Figure 15:
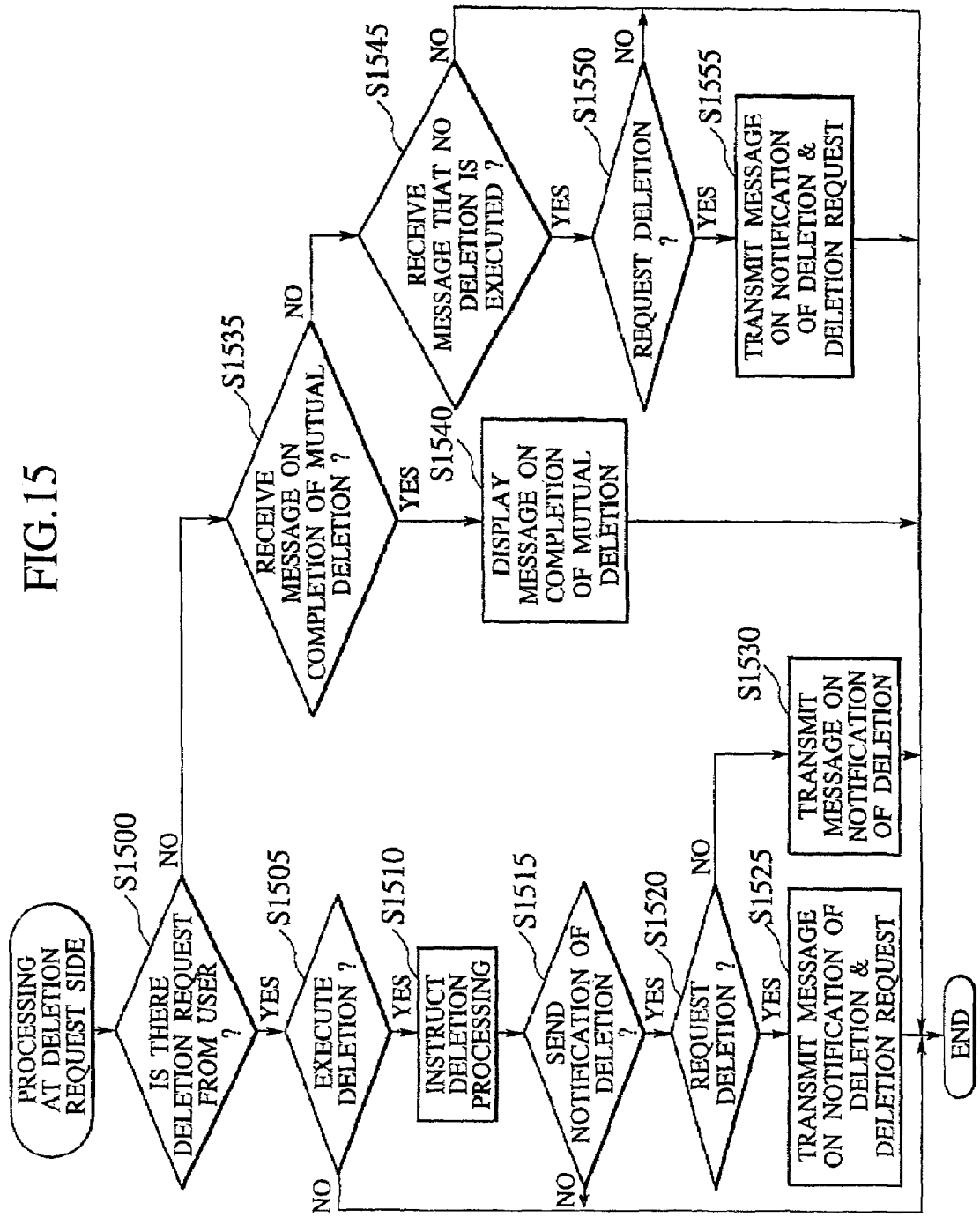
FIG. 15 is a flowchart illustrating processing procedures using a viewer program according to an embodiment of the present invention.

Processing procedures shown in FIG. 15 are carried out when the CPU 201a of the game machine main body 201 of the client system 103a that MAEHIRO uses executes the viewer program loaded onto the RAM of the-system memory 201b from the CD-ROM 210. The CPU 201a refers to data stored in the memory card 211 inserted to the memory card slot 201f.

Figure 16:
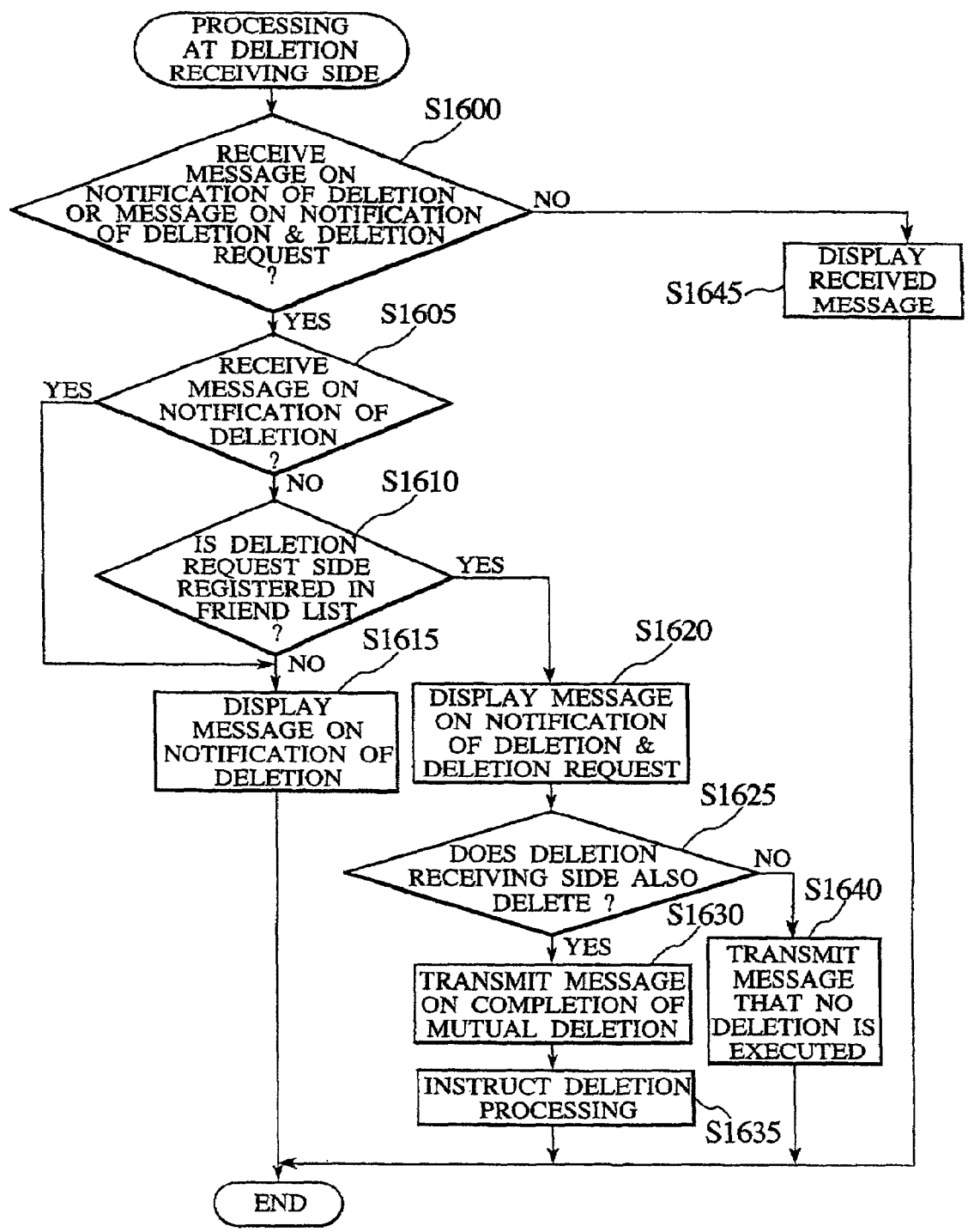
FIG. 16 is a flowchart illustrating processing procedures using a viewer program according to an embodiment of the present invention.

Processing procedures shown in FIG. 16 are carried out when the CPU of the game machine main body 204 of the client system 103b that JUNKO uses executes the viewer program loaded onto the RAM of the system memory from the CD-ROM.

Figure 13:
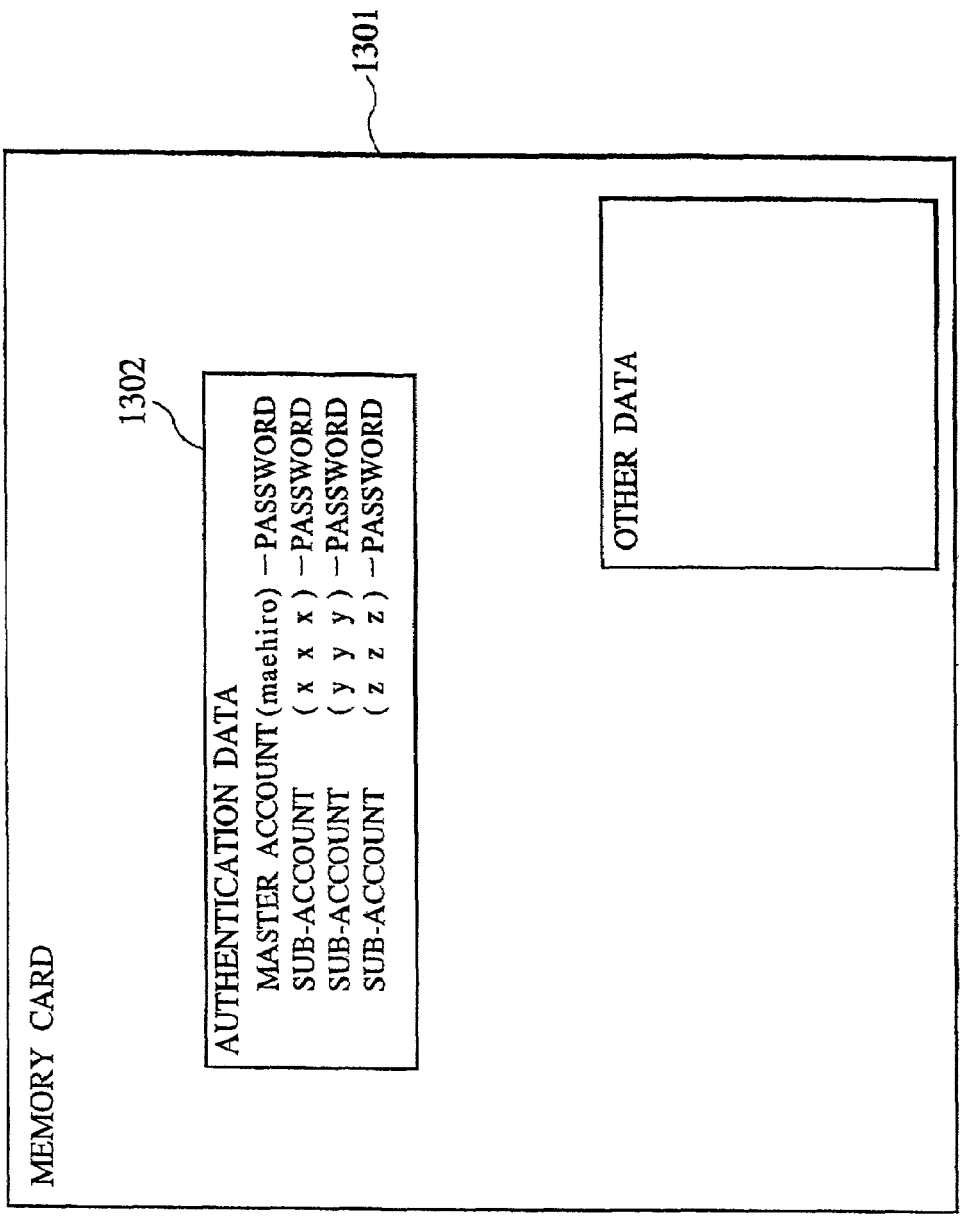
FIG. 13 is an explanatory view of a memory card according to an embodiment of the present invention.

In FIG. 13, a memory card 1301 stores authentication data 1302 and other data. FIG. 13 shows MAEHIRO's memory card, but the client system 103b, which JUNKO uses, also includes a memory card in which the same type of authentication data as that of the memory card 1301 is stored. The authentication data 1302 includes a master account, which is an account for logging in the viewer and for,gaining access to the server group 102, and three sub-accounts, and passwords associated with the respective accounts.

Figure 14:
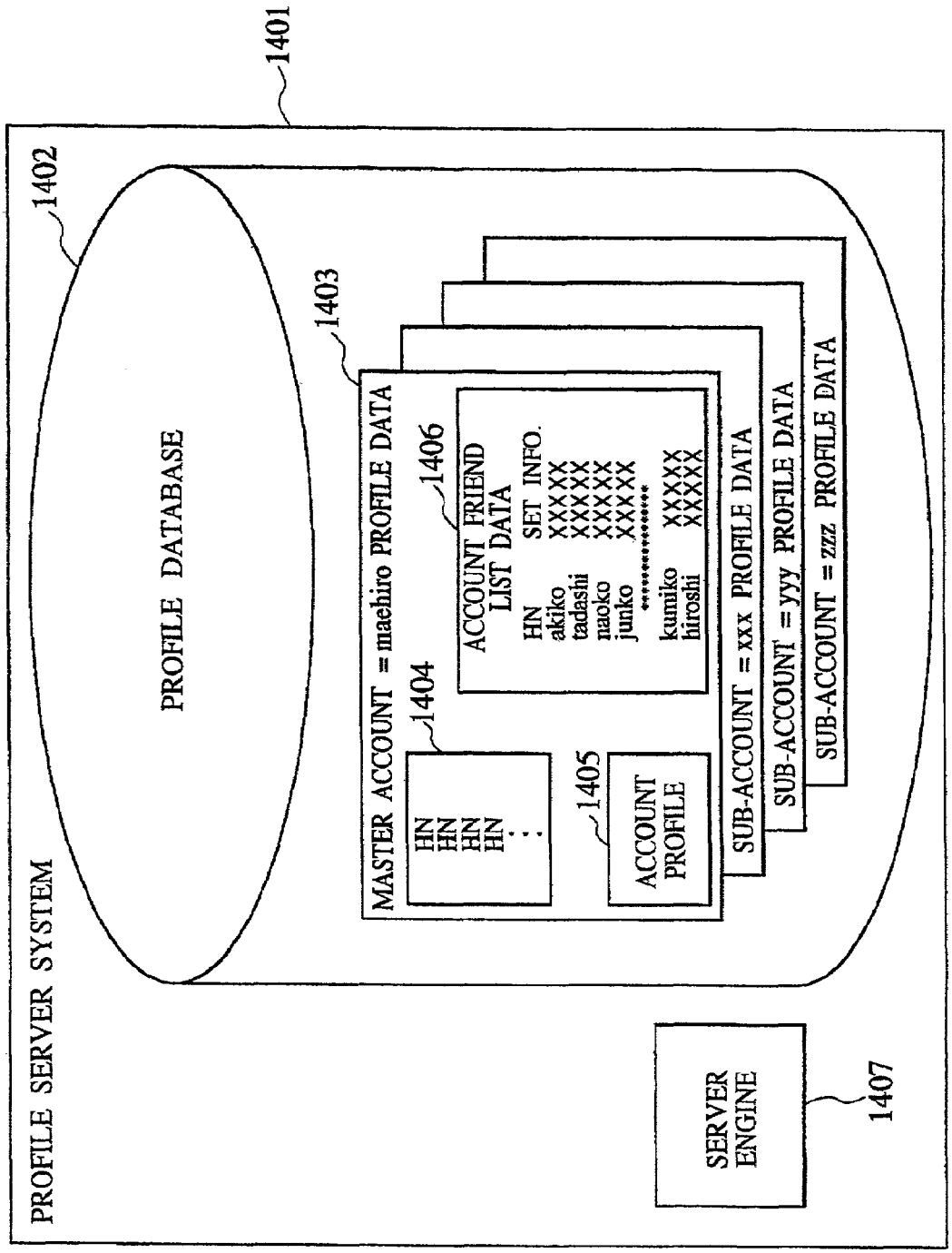
FIG. 14 is an explanatory view of a profile database according to an embodiment of the present invention.

In FIG. 14, a profile server system 1401 includes a profile database 1402, a server engine 1407, and the like. The profile database 1402 includes account profile data 1403 associated with the respective accounts. For example, the account profile data 1403 for account "maehiro" includes an account HN group 1404, an account profile 1405, and account friend list data 1406. The profile server system 1401 is one of the profile server systems that the profile server group 102g has.

The account HN group 1404 has a group of HNs preregistered by the viewer initiated by the client system 103a. MAEHIRO, who is the user of the master account "maehiro", uses a HN selected by the viewer from among the HNs as an active HN, and performs the transmission/reception of the message using the selected HN. The active HN, which is selected by MAEHIRO, is the same one as the master account "maehiro" to simplify the explanation.

The account profile data 1403 manages the profile of MAEHIRO's profiles of the account "maehiro."

The account friend list data 1406 is data in which the HNs of the member users, with whom MAEHIRO has become acquainted via an online game, is set and registered as a friend. The account friend list data 1406 has setting information of friends With the respective HNs (for example, simple profile 610, etc). The account friend list data 1406 provides a friend list setting function, which the online games provided by, e.g., the game A server group 102e and the game B server group 102f, so that information of the other users may be set and registered. A registration setting method may follow the method for registering information of the users to the list in the conventional ICQ etc. When the HN is deleted from the account HN group 1404, the corresponding user information is deleted from the account friend list data 1406.

The CPU 201a verifies an account "maehiro" input by the user on the initial screen page of the viewer and a password against a pair of an account and a password of authentication data 1302 stored in the memory card 1301. When verification is established, the CPU 201a allows logging-in to the viewer and displays the viewer menu screen page 501 shown in FIG. 5 on the TV set 202.

When detecting the decision operation of the navigator command button 503, the CPU 201a initiates the navigator. The CPU 201a gains access to the server group 102 using the above-mentioned account and the password needed to log in the viewer, and requests authentication. When the client system 103a is online to the server group after obtaining the authentication, the CPU 201a causes the viewer to initiate the messenger and displays the main window 602 therein.

The CPU 201a gains access to the profile server system and obtains the account friend list data 1406 stored in the profile database 1402. The account friend list data 1406 is loaded to the RAM of the system memory 201b, so that the friend list is displayed on the main window 602 of the messenger as illustrated in FIG. 6. The CPU 201a inquires of the message server group 102c, and obtains information on the online friends 606, information on the offline friends 607 and information on the user state of the online friends 606 (for example, name of the online game currently in use). Consequently, the lists of the online friends 606 and the offline friends 607 are displayed in the messenger as illustrated in FIG. 6.

For example, when detecting that HN "junko" 608 in the friend list is indicated by the cursor in the main window 602, the CPU 201a displays information of JUNKO on the information window 609. In the information window 609, the CPU 201a displays JUNKO's simple profile 610 with HN "junko", which is obtained from the account friend list data and stored in the RAM, and the user state 611 of JUNKO obtained by the messenger group 102c.

For example, when detecting the decision operation to the HN "junko" 608 indicated by the cursor, the CPU 201a displays the friend screen page 701, which is used to instruct various kinds of sub-commands to JUNKO with HN "junko", on the TV set 202.

In FIG. 15, when detecting the decision operation of the registration deletion command button 702 illustrated in FIG. 7, the CPU 201a displays the friend screen page 801, which is used to inquire of the user about the deletion of the HN "junko" from the friend list of the account "maehiro", on the TV set 202 (step S1500).

The CPU 201a displays the warning "JUNKO will be deleted from the friend list. Is it all right?" on the warning window 802 of the friend screen page 801. When detecting he decision operation of the "YES" button 804 on the friend screen page 801, the CPU 201a sends the profile server system an instruction indicating that the HN "junko" is deleted from the friend list of account "maehiro" (steps S1505→1510). The profile server system performs processing for deleting the HN "junko" from MAEHIRO's friend list (account friend list 1406) based on this instruction.

When the HN "junko" is deleted, the CPU 201a displays the friend screen page 901 shown in FIG. 9 on the TV set 202. The CPU 201a displays the point "Deletion has been completed. Do you wish to notify Junko of the deletion?" When detecting the decision operation of the "YES" button 904 on the friend screen page 901, the CPU 201a displays the friend screen page 1001 of FIG. 10 to ask whether or not the message on the notification of deletion & deletion request should be transmitted on the TV set 202 (steps S1515→1520).

On the warning window 1002 of the friend screen page 1001, the CPU 201a displays the point "So, message on the notification of deletion is transmitted. There is a possibility that you are still registered in the junko's friend list. Do you wish to request the deletion?" When detecting the decision operation of the "YES" button 1004 on the friend screen page 1001, the CPU 201a sends the message server system the message on the notification of deletion and deletion request to JUNKO (steps S1520→1525→end). After that, the CPU 2011a moves to a messenger mode for receiving an autonomous message about the fact that the registration of his HN "maehiro" from the JUNKO's friend list has been deleted from the profile server system.

When detecting the decision operation of the "NO" button 805 on the friend screen page 801 of FIG. 8, the CPU 201a erases the warning window 802 and the selection window 803 and ends the processing (step S1505→end). When detecting the decision operation of the "NO" button 905 on the friend screen page 901 of FIG. 9, the CPU 201a erases the warning window 902 and the selection window 903 and ends the processing (steps S1515→end). When detecting the decision operation of the "NO" button 1005 on the friend screen page 1001 of FIG. 10, the CPU 201a sends the message server system the message on the notification of deletion to JUNKO and ends the processing (steps S1520→S1530→end).

In FIG. 16, it is assumed that the CPU of the client system 103b receives the message on the notification of deletion and deletion request sent by MAEHIRO from the message server system while JUNKO with HN "junko" is performing the message exchange with NAOKI with HN "naoki." The CPU of the client system 103b sends the profile server system an instruction to ask whether or not the HN "maehiro" is registered to the friend lists of the JUNKO's accounts (steps S1600→S1605→1610).

When receiving the notification that HN "maehiro" is registered to the friend lists of JUNKO's accounts from the profile server system, the CPU of the client system 103b displays the message screen page 1201 having the autonomous message 1202, the choice "YES" button 1203, the choice "NO" button 1204 and the like on the TV set 205 (steps S1610→S1620).

On the TV set 205, the CPU of the client system 103b displays the autonomous message 1202 indicating the point "Junko has been deleted from maehiro's friend list. A deletion request to your friend list has been delivered. Do you wish to delete maehiro registered in junko's friend list?" from the message sever system. When detecting the decision operation of the choice "YES" button 1203 in a state that the autonomous message 1202 is displayed, the CPU of the client system 103b transmits a message on a mutual deletion completion to the messenger server system to instruct the profile server system to delete the HN "maehiro" from the JUNKO's friend lists (steps S1625→S1630 S1635→end). The profile server system performs processing for deleting "maehiro" from JUNKO's friend lists based on this instruction.

When detecting the decision operation of the choice "NO" button 1204 in a state that the autonomous message 1202 indicating the point "Junko has been deleted from the maehiro's friend list. A deletion request to your friend list has been delivered. Do you wish to delete maehiro registered in junko's friend list?" is displayed, the CPU of the client system 103b sends the message server system the message in which no deletion of the HN "maehiro" is performed (steps S1625→S1640→end).

In FIG. 16, it is assumed that the CPU of the client system 103b receives the message on the notification of deletion and deletion request sent by MAEHIRO from the message server system while JUNKO with HN "junko" is performing the message exchange with NAOKI with HN "naoki." The CPU of the client system 103b sends the profile server system an instruction to ask whether or not the HN "maehiro" is registered to the friend lists of JUNKO's accounts (steps S1600→S1605→1610).

When receiving the notification that no HN "maehiro" is registered to the friend lists of JUNKO's accounts from the profile server system, the CPU of the client system 103b displays an autonomous message, which indicates the point "Junko has been deleted from maehiro's friend list" in place of the autonomous message 1202 and which is sent from the message server system, on the TV set 205 (steps S1610→S1615→end).

In FIG. 16, it is assumed that the CPU of the client system 103b receives the message on the notification of deletion sent by MAEHIRO from the message server system while JUNKO with HN "junko" is performing the message exchange with NAOKI with HN "naoki" (steps S1600→S1605). In this case, the CPU of the client system 103b displays an autonomous message, which indicates the point "Junko has been deleted from maehiro's friend list" in place of the autonomous message 1202 and which is sent from the message server system, on the TV set 205 (steps S1605→S1615→end).

In FIG. 16, it is assumed that the CPU of the client system 103b receives a message other than the message on the notification of deletion and the message on the notification of deletion and the deletion request. In this case, the CPU of the client system 103b displays the received message on the TV set 205 (steps S1600→S1645→end).

When the message to MAEHIRO is sent to the message server system from the client system 103b in step S1630 or S1640, the corresponding message arrives at MAEHIRO'S client system 103a. Back to FIG. 15, the explanation of processing in MAEHIRO'S client system 103a is continued.

When receiving the message on the mutual deletion completion, which indicates that the HN "maehiro" has been deleted from JUNKO's friend lists of the profile sever system, from the message server system in a state that the messenger is in a message mode, the CPU 201a displays the message screen page 1101 having the autonomous message 1102 indicating the point "Maehiro has been deleted from junko's friend list" as shown in FIG. 11 on the TV set 205 (steps S1500→S1535→S1540→end).

In FIG. 15, when receiving a message on no deletion sent by JUNKO from the message server system, the CPU 201a displays the message screen page 1101 having an autonomous message indicating the point "The message on the deletion request was sent to junko but no deletion was performed. Do you wish to send the deletion request again?" in place of autonomous message 1102 and a choice "YES" button and a choice "NO" button in a command field 1103 on the TV set 202 (steps S1500→S1535→S1545→S1550).

When detecting the decision operation of the choice "YES" button in a state that this autonomous message is displayed, the CPU 201a retransmits the message on the notification of deletion and deletion request to JUNKO to the message server system (steps S1550→S1555→end). In the case where the CPU 201a detects the decision operation of the choice "NO" button, the CPU 201a erases this autonomous message and ends the processing (steps S1550→end).

According to the above-explained embodiment, there is a case in which MAEHIRO and JUNKO are mutually registered in their friend lists in the message exchange system. In this case, when MAEHIRO's client system 103a deletes the registration of JUNKO's HN "junko", who uses the client system 103b, from his friend lists, MAEHIRO's client system 103a notifies JUNKO's client system 103b of the fact. MAEHIRO's client system 103a further requests JUNKO's client system 103b to delete the registration of his HN "maehiro" from JUNKO's friend lists. In this way, both MAEHIRO and JUNKO mutually delete their HNs from their friend lists. At the time of deleting-the registration of HNs, other information associated with HNs is also deleted from the friend lists.

In other words, this makes it possible to prevent MAEHIRO from being held registered in JUNKO's friend lists in spite of the fact that JUNKO is not registered in MAEHIRO's friend lists. Accordingly, this makes it possible to prevent occurrence of trouble in a mismatch between users in terms of the message exchange. It is possible to prevent other information including his HN "maehiro" from being held registered in JUNKO's friend lists against his will.

ALTERNATIVE EMBODIMENTS

In another embodiment, FIGS. 1 to 5 and FIGS. 13 and 14 are the same as those of the previously described embodiment. Although the preceding description has explained the case in which user information is deleted from the friend list, a case is now explained in which user information is registered to the friend list.

Friend List Registration Client System Processing

Figure 17:
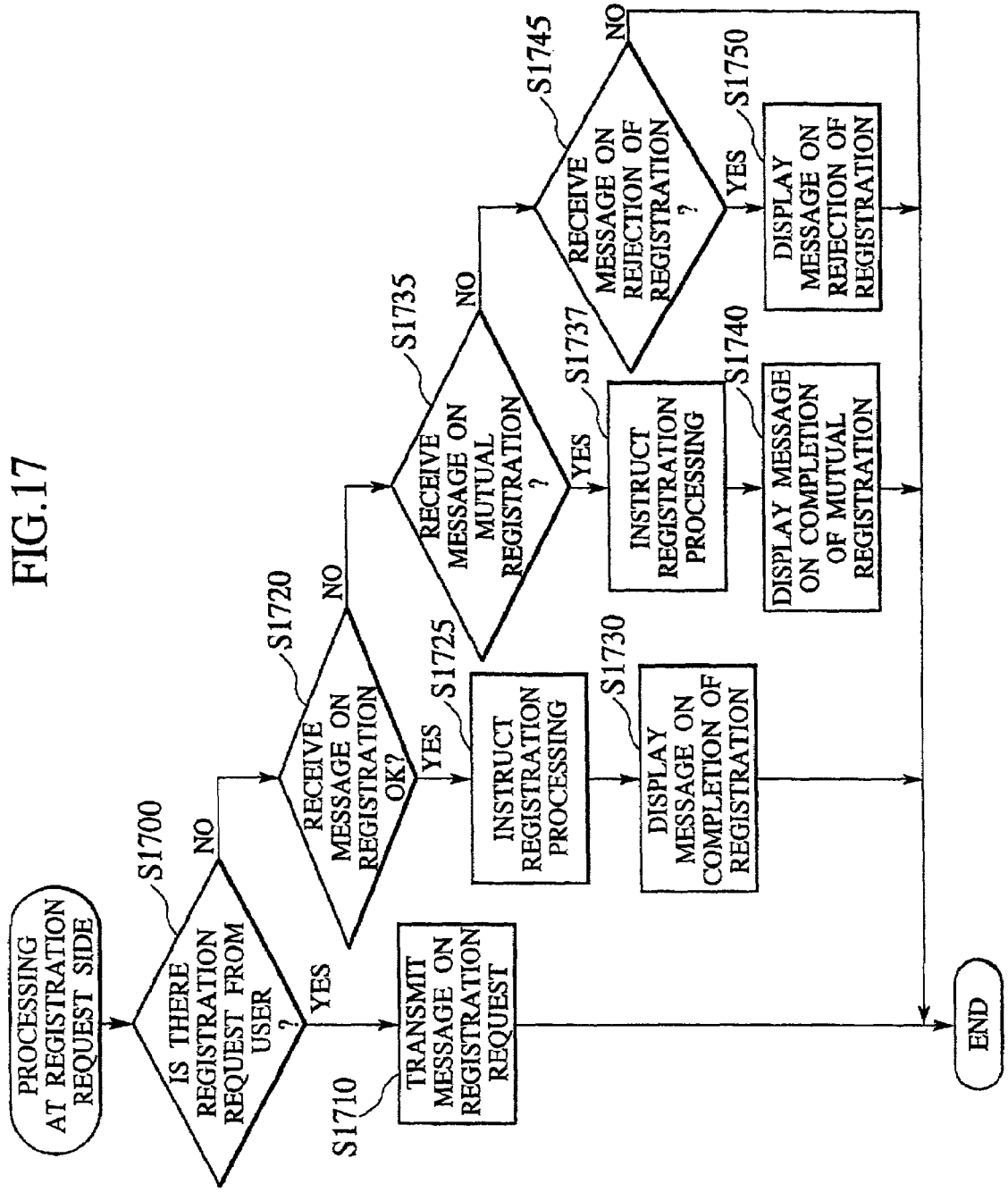
FIG. 17 is a flowchart illustrating processing procedures using a viewer program according to an embodiment of the present invention.
Figure 18:
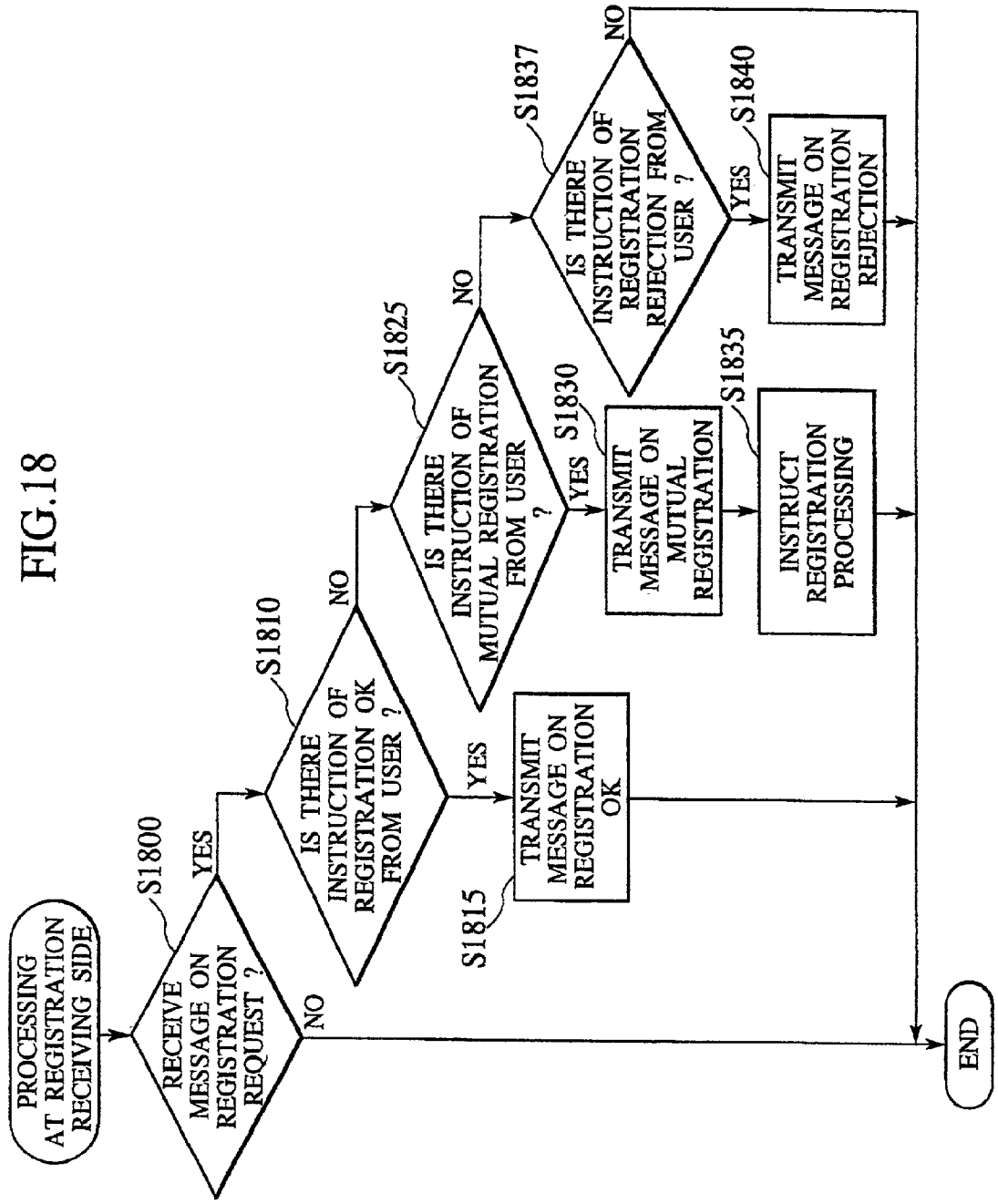
FIG. 18 is a flowchart illustrating processing procedures using a viewer program according to an embodiment of the present invention.

The following will explain the processing procedures in the aforementioned system structure shown in FIGS. 1 to 4, which procedures are executed when MAEHIRO registers HN "junko" of JUNKO, who uses the client system 103b, to his friend lists by use of the client system 103a, with reference to data contained in the memory card of FIG. 13, the profile database of FIG. 14, and the flowcharts of FIGS. 17 and 18.

In connection with the message transmitted/received between the client systems, the respective HNs of the transmitting side and the receiving side are included in the message header, and the server group 102 and the client systems 103a and 103b can recognize the transmitter of the message and the receiver thereof in the message exchange system. Namely, these points are the same as those described before.

Processing procedures shown in FIG. 17 are carried out when the CPU 201a of the game machine main body 201 of the client system 103 used by MAEHIRO executes the viewer program loaded onto the RAM of the system memory 201b from the CD-ROM 210. The CPU 201a refers to data stored in the memory card 211 inserted to the memory card slot 201f.

Processing procedures shown in FIG. 18 are carried out when the CPU of the game machine main body 204 of the client system 103b used by JUNKO executes the viewer program loaded onto the RAM of the system memory 204 from the CD-ROM.

When MAEHIRO is to register JUNKO's HN "junko", who uses the client system 103b, in his friend lists, he asks JUNKO to approve the registration. In the case where JUNKO, who has been asked to approve the registration by MAEHIRO, wishes to mutually register their HNs to their friend lists, she registers MAEHIRO's HN "maehiro" to her friend lists and sends back a notification of mutual registration to MAEHIRO. MAEHIRO, who has received the notification of mutual registration, registers JUNKO's HN "junko" to his friend lists. In this way, a feature of the message exchange system of lies in the point that their HNs can be mutually registered to their friend lists.

Similar to above, the viewer menu screen page 501 is displayed on the TV set 202. When detecting the decision operation of the game command button 504, the CPU 201a initiates the game tool. The CPU 201 a gains access to the game A server group 102e or the game B server group 102f with the account and password used to log in the viewer, and requests authentication. When authentication is obtained and the viewer is online to the server groups 102, the CPU 201a initiates the game tool and displays the main window of the game therein.

In FIG. 17, the CPU 201a detects the decision operation of registering the HN "junko" who participates in the online game by the friend list setting function of the online game. The CPU 201a transmits the message on the registration request to JUNKO to the message server in order to ask JUNKO to approve the registration of HN "junko" to the friend list of the account "maehiro" (steps S1700→S1710→end). Thereafter, the CPU 201a moves to a mode for receiving JUNKO's response message from the message server system.

In FIG. 18, it is assumed that the CPU of JUNKO's client system 103b receives the registration request message sent by MAEHIRO from the message server system while JUNKO with HN "junko" is playing the online game.

On the TV set 205, the CPU of the client system 103b displays a warning window, which displays an autonomous message "Is it all right to register junko to maehiro's friend list?" from the message server system based on the registration request message, and a selection window, which has a "registration OK" button, a "registration rejection" button, a "mutual registration button" and the like (step S1800→S1810).

When detecting the decision operation of the "registration OK" button in step S1810, the CPU of the client system 103b transmits a registration OK message to MAEHIRO to the message server system (step S1815→end).

When detecting the decision operation of the "mutual registration" button in a state that this autonomous message is displayed in step S1810, the CPU of the client system 103b transmits the mutual registration message to MAEHIRO to the message server system to instruct to register the HN "maehiro" to JUNKO's friend lists (steps S1825→S1830→1835→end). The profile sever system performs processing for registering the HN "maehiro" to JUNKO's friend lists based on this instruction.

When detecting the decision operation of the "registration rejection" button in a state that the above autonomous message is displayed in step S1810, the CPU of the client system 103b transmits the registration rejection message to MAEHIRO to the message server system (steps S1825→S1837→1840→end).

When the message to MAEHIRO is sent to the message server system from the client system 103b in steps S1815 or S1835, the corresponding message arrives at MAEHIRO's client system 103a. Back to FIG. 17, the explanation of processing in MAEHIRO'S client system 103a is continued.

When receiving the registration OK message sent by JUNKO from the message server system while MAEHIRO is playing the online game, the CPU 201a sends an instruction to register the HN "junko" to MAEHIRO'S friend lists to the profile server system (step S1700→1720→1725). The profile sever system performs processing for registering the HN "junko" to MAEHIRO's friend lists, and sends the registration OK message to MAEHIRO's client system 103a. On the TV set 202, the CPU 201a displays the warning window showing an autonomous message "Junko has registered to maehiro's friend list." based on this registration OK message (step S1730→end).

When receiving the mutual registration message sent by JUNKO from -the message server system, the CPU 201a sends an instruction to register the HN "junko" to MAEHIRO'S friend lists to the profile server system (step S1700→1720→1735→1737). The profile sever system performs processing for registering the HN "junko" to MAEHIRO's friend lists, and sends the mutual registration message to MAEHIRO's client system 103a. On the TV set 202, the CPU 201a displays the warning window showing an autonomous message "Junko has registered to maehiro's friend list. The mutual registration has been completed." based on this registration OK message (step S1740→end).

When receiving a registration rejection message sent by JUNKO from the message server system, the CPU 201a does not send an instruction to register the HN "junko" to MAEHIRO'S friend lists to the profile server system but transmits the registration rejection message to the MAEHIRO's client system 103a. On the TV set 202, the CPU 201a displays the warning window showing an autonomous message "Junko cannot be registered to maehiro's friend list. It is rejected." based on this registration rejection message (step S1700→S1720→S1735→S1745→1750→end).

According to the above-explained embodiment, in the case where MAEHIRO registers JUNKO's HN, who uses the client system 103b, to his friend list in the message exchange system, he asks JUNKO to approve the registration. In the case where JUNKO, who has been asked to approve the registration by MAEHIRO, wishes to mutually register their HNs to their friend lists, she registers MAEHIRO's HN to her friend list and sends back a notification of mutual registration to MAEHIRO. MAEHIRO, who has received the notification of mutual registration, registers JUNKO's HN "junko" to his friend lists. In this way, their HNs can be mutually registered to their friend lists.

Accordingly, the users can mutually register user information including their HNs to their friend lists in the simple procedures. It is possible to prevent information of the other user, who wishes mutual registration, from being held registered in one user's friend list.

In addition to the aforementioned embodiments, the following embodiment can be applied.

In the aforementioned embodiments, the client systems are used as video game machines intended for home use. However, PCs may be used as client systems. In this case, the viewer may be mounted on a hard disk in advance without limiting the loading from the CD-ROM. Authentication data may be stored in the hard disk in place of the memory card 1301. A mouse or keyboard may be used in place of the controller.

In the aforementioned embodiments, the client systems are used as video game machines intended for home use. However, terminals or game machines, which are set up at an amusement arcade may be used as client systems. In this case, the viewer may be mounted on built-in storage in advance without limiting the loading from the CD-ROM. Authentication data may be stored in storage built in the game machine main body 201 in place of the memory card 1301. A known arbitrary input device may be used as an input device corresponding to the controller.

In the aforementioned embodiments, the client systems are used as video game machines intended for home use. However, program-executable hand-held terminals, such as a cellular phone, a PDA (Personal Digital Assistance) etc., may be used as client systems. In this case, the viewer may be mounted on a built-in ROM. Flash memory may be used to store authentication data in place of the memory card 1301. An input key such as a keyboard can be used as an input device corresponding to the controller.

In the aforementioned embodiment, authentication data 1002 etc. are stored in the memory card 1301. However, authentication data may be stored in the RAM separately provided in the game machine, and the player may input it from the input device.

In the aforementioned embodiment, it was assumed that the Internet was used as the communication network 1001. However, the communication network 101 may be a commercial network of a closed environment or a LAN (Local Area Network). The server group 102 was composed of the server groups 102*a* to 102*g*, which were connected to one another via the LAN 102*h*. However, the functions of the server groups 102*a* to 102*g* may be realized on one general-purpose computer.

In the aforementioned embodiment, the program shown by the flowcharts of FIGS. 15 to 18 was loaded onto the RAM of the system memory 201*b* from the CD-ROM 210 to e executed. However, this program may be superimposed on a carrier wave and downloaded to the game machine main bodies 201, 204, 207 or PCs forming the client systems 104*a* and 104*b* from the server group 102 via the communication network 110. This program may be stored in a fixed disk device, and downloaded to the game machine main body 201, 204, 207 or PCs. The fixed disk device may be included in a server apparatus on the communication network 101, other than the server groups 102*a* to 102*g*.

What is claimed is:

1. A message exchange system in which at least a first client system used by a first user and a second client system used by a second user are connected to each other via at least one server system and a communication network and each client system exchanges a message via said server system, comprising:
    a storage device that stores a list for each user, registering information of one or more users to be subject to message exchange;
    said first client system comprising:
        a first deleting device that deletes registration information of said second user from a list of said first user based on an instruction from said first user; and
        a deletion requesting device that transmits a deletion request message, for deleting the registration information of said first user from a list of said second user, to said second client system via said server system when said first deleting device deletes the registration information of said second user from said list of said first user, and
    said second client system comprising:
        a second deleting device that deletes the registration information of said first user from said list of said second user when receiving said deletion request message from said server system.

2. The message exchange system according to claim 1, wherein said second client system further comprises:
    a registration determining device that determines whether information of said first user is registered in said list of said second user when receiving said deletion request message from said server system, and
    wherein said second deleting device deletes the registration of information of said first user when said registration determining device determines that information of said first user is registered in said list of said second user.

3. The message exchange system according to claim 1, wherein said deletion requesting device transmits the deletion request message for deleting the registration information of said first user from said list of said second user to said second client system via said server system when instructed by said first user to delete the registration information of said first user from said list of said second user user.

4. The message exchange system according to claim 1, wherein said second deleting device deletes the registration information of said first user from said list of said second user when instructed by said second user to delete the registration information of said first user from said list of said second user.

5. The message exchange system according to claim 1, further comprising:
    a transmitter that transmits a deletion completion message to said first client system via said server system when said second deleting device deletes said registration information of said first user from said list of said second user.

6. The message exchange system according to claim 1, wherein said storage device is provided in said server system, and said first deleting device comprises a device that requests said server system to delete the registration information of said second user.

7. The message exchange system according to claim 4, wherein said storage device is provided in said server system, and said first deleting device comprises a device that requests said server system to delete the registration information of said second user, and said second deleting device comprises a device that requests said server system to delete the registration information of said first user.

8. A message exchange system in which at least a first client system used by a first user and a second client system used by a second user are connected to each other via at least one server system and a communication network and each client system exchanges a message via said server system, comprising:
- a storage device that stores a list for each user, registering information of one or more users to be subject to message exchange;

said first client system comprising:
- a first deleting device that deletes registration information of said second user from a list of said first user based on an instruction from said first user; and
- a deletion notifying device that transmits a notification of deletion message, which notifies that registration information of said first user is deleted from a list of said second user, to said second client system via said server system, when said first deleting device deletes the registration information of said second user from said list of said first user.

9. A client system that exchanges a message with another client system via a server system connected to a communication network, comprising:
- a deleting device that deletes registration information of a second user from a list of a first user based on an instruction from said first user of said client system; and
- a deletion requesting device that transmits a deletion request message, causing deletion of the registration information of said first user from a list of said second user, to said other client system used by said second user via said server system when said deleting device deletes the registration information of said second user from said list of said first user.

10. A client system that exchanges a message with another client system via a server system connected to a communication network, comprising:
- a receiving device that receives a deletion request message for deleting registration of information of a first user from a list of a second user, who uses said client system, from said server system; and
- a deleting device that deletes the registration of information of said first user from said list of said second user when said receiving device receives said deletion request message.

11. The client system according to claim 10, further comprising:
- a registration determining device that determines whether information of said first user is registered in said list of said second user when said receiving device receives said deletion request message, wherein
- said deleting device deletes the registration information of said first user when said registration determining device determines information of said first user is registered in said list of said second user.

12. A message exchange method of a message exchange system in which at least a first client system used by a first user and a second client system used by a second user are connected to each other via at least one server system and a communication network and each client system exchanges a message via said server system, comprising:
- preparing a list for each user, for registering information of one or more users to be subject to message exchange;
- deleting registration information of said second user from the list of said first user based on an instruction from said first user of said first client system;
- transmitting a deletion request message, for deleting the registration of information of said first user from the list of said second user, to said second client system via said server system when information of said second user is deleted from said list of said first user; and
- deleting the registration information of said first user from said list of said second user of said second client system when said second client system receives said deletion request message from said server system.

13. The message exchange method according to claim 12, further comprising:
- determining whether information of said first user is registered in said list of said second user when said second client system receives said deletion request message from said server system, and wherein
- the deletion of registration information of said first user is executed when it is determined that information of said first user is registered in said list of said second user.

14. The message exchange method according to claim 12, further comprising:
- executing a deletion request message for deleting the registration information of said first user from said list of said second user, wherein
- the deletion request message is transmitted to said second client system via said server system when said first user instructs said request.

15. The message exchange method according to claim 12, wherein the deletion of information of said first user from said list of said second user is performed when said second user instructs the deletion of the registration of information of said first user from said list of said second user.

16. The message exchange method according to claim 12, further comprising:
- transmitting a deletion completion message to said first client system via said server system when said registration information of said first user is deleted from said list of said second user.

17. The message exchange method according to claim 12, wherein said list for each user is stored in a storage device in said server system.

18. A message exchange method of a message exchange system in which at least a first client system used by a first user and a second client system used by a second user are connected to each other via at least one server system and a communication network and each client system exchanges a message via said server system, comprising:
- preparing a list for each user, for registering information of one or more users to be subject to message exchange;
- deleting registration information of said second user from a list of said first user based on an instruction from said first user of said first client system; and
- transmitting a notification of deletion message, notifying that the registration information of said first user is deleted from the list of said second user, to said second client system via said server system when the registration information of said second user is deleted from said list of said first user.

19. A message exchange method, which is executed by a client system that exchanges a message with another client system via a server system connected to a communication network, comprising:
- deleting registration information of a second user from a list of a first user based on an instruction from said first user of said client system; and
- transmitting a deletion request message, causing deletion of the registration information of said first user from a list of said second user, to said other client system used by said second user via said server system when the registration information of said second user is deleted.

20. A message exchange method, which is executed by a client system that exchanges a message with another client system via a server system connected to a communication network, comprising:

receiving a deletion request message for deleting registration of information of a first user from a list of a second user from said server system; and deleting the registration information of said first user from said list of said second user when the deletion request message is received.

21. The message exchange method according to claim 20, further comprising:

determining whether information of said first user is registered in said list of said second user when said deletion request message is received, wherein the registration information of said first user is deleted when it is determined that information of said first user is registered in said list of said second user.

22. A client system that exchanges a message with another client system via a server system connected to a communication network, comprising;

storage that stores a program;

a processor that executes said program; and a communication device that communicates with said server system via said communication network, wherein said storage includes the program comprising instructions for:

deleting registration of information of a second user from a list of a first user based on an instruction from said first user of said client system; and transmitting a deletion request message, causing deletion of the registration information of said first user from a list of said second user, to said other client system used by said second user via said server system when the registration of information of said second user is deleted.

23. A client system that exchanges a message with another client system via a server system connected to a communication network, comprising:

storage that stores a program;

a processor that executes said program; and a communication device that performs communication with said server system via said communication network, wherein said storage includes the program comprising instructions for:

receiving a deletion request message for deleting registration information of a first user from a list of a second user from said server system; and deleting the registration information of said first user from said list of said second user when said deletion request message is received.

24. A computer-readable storage medium on which is recorded a program for causing a client system to exchange a message with another client system via a server system connected to a communication network, said program comprising instructions for:

deleting registration information of a second user from a list of a first user based on an instruction from said first user of said client system; and transmitting a deletion request message, causing deletion of the registration of information of said first user from a list of said second user to said other client system used by said second user via said server system when the registration information of said second user is deleted.

25. A computer-readable storage medium recording a program for causing a client system to exchange a message with another client system via a server system connected to a communication network, said program comprising:

receiving a deletion request message for deleting registration information of a first user from a list of a second user from said server system; and deleting the registration of information of said first user from said list of said second user when said deletion request message is received.

* * * * *

UNITED STATES PATENT AND TRADEMARK OFFICE
CERTIFICATE OF CORRECTION

PATENT NO. : 7,058,690 B2
APPLICATION NO. : 10/107198
DATED : June 6, 2006
INVENTOR(S) : K. Maehiro et al.

Page 1 of 1

It is certified that error appears in the above-identified patent and that said Letters Patent is hereby corrected as shown below:

At column 22, line 40 (claim 3, line 7 ) of the printed patent, delete "user" (second occurrence).

Signed and Sealed this

Twenty-third Day of January, 2007

JON W. DUDAS
*Director of the United States Patent and Trademark Office*